United States Patent
Tanabe et al.

(10) Patent No.: US 10,491,740 B2
(45) Date of Patent: Nov. 26, 2019

(54) ELECTRONIC DEVICE AND CONTROL METHOD HAVING FINGERPRINT DETECTION FEATURES

(71) Applicant: KYOCERA Corporation, Kyoto (JP)

(72) Inventors: Shigeki Tanabe, Yokohama (JP); Hideki Morita, Yokohama (JP); Isao Masuike, Machida (JP); Shinya Saito, Hachiouji (JP); Yasuhiro Ueno, Yokohama (JP); Koutaro Yamauchi, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/898,292

(22) Filed: Feb. 16, 2018

(65) Prior Publication Data

US 2018/0255172 A1 Sep. 6, 2018

(30) Foreign Application Priority Data

Mar. 1, 2017 (JP) ................................. 2017-038811

(51) Int. Cl.
| | |
|---|---|
| *G06F 21/32* | (2013.01) |
| *H04M 1/725* | (2006.01) |
| *G06F 3/0354* | (2013.01) |
| *G06F 3/0484* | (2013.01) |
| *G06K 9/00* | (2006.01) |
| *G06F 3/0482* | (2013.01) |
| *H04M 1/67* | (2006.01) |
| *G07C 9/00* | (2006.01) |

(52) U.S. Cl.
CPC ...... *H04M 1/72569* (2013.01); *G06F 3/0354* (2013.01); *G06F 3/0482* (2013.01); *G06F 3/0484* (2013.01); *G06K 9/00013* (2013.01); *G06K 9/00087* (2013.01); *G07C 9/00158* (2013.01); *H04M 1/67* (2013.01)

(58) Field of Classification Search
CPC ... H04M 1/72569; H04M 1/67; G06F 3/0484; G06F 3/0482; G06F 3/0354; G06F 21/32; G06F 1/1684; G06F 1/1671; G06F 1/1626; G06K 9/00087; G06K 9/00013; G06K 9/00912; G07C 9/00158
See application file for complete search history.

(56) References Cited

U.S. PATENT DOCUMENTS

| | | | | |
|---|---|---|---|---|
| 9,547,789 | B2 * | 1/2017 | Park | G06F 1/1643 |
| 2015/0248209 | A1 * | 9/2015 | Kim | H04M 1/236 |
| | | | | 345/173 |
| 2015/0301664 | A1 * | 10/2015 | Tsai | G06F 3/0412 |
| | | | | 345/173 |
| 2016/0259528 | A1 * | 9/2016 | Foss | G06F 3/0482 |
| 2017/0223178 | A1 * | 8/2017 | Miura | H04M 1/72583 |
| 2017/0351850 | A1 * | 12/2017 | Jin | G06F 3/0414 |
| 2018/0007192 | A1 | 1/2018 | Tanabe et al. | |

FOREIGN PATENT DOCUMENTS

WO 2016/121876 A1 8/2016

* cited by examiner

*Primary Examiner* — Rodney Amadiz
(74) *Attorney, Agent, or Firm* — Studebaker & Brackett PC

(57) ABSTRACT

An electronic device includes an push button, a fingerprint sensor configured to detect a fingerprint of a finger contacting the push button, and a controller configured to release a locked state when it is determined that the push button has been pressed and that the fingerprint detected by the fingerprint sensor matches preregistered fingerprint information.

12 Claims, 15 Drawing Sheets

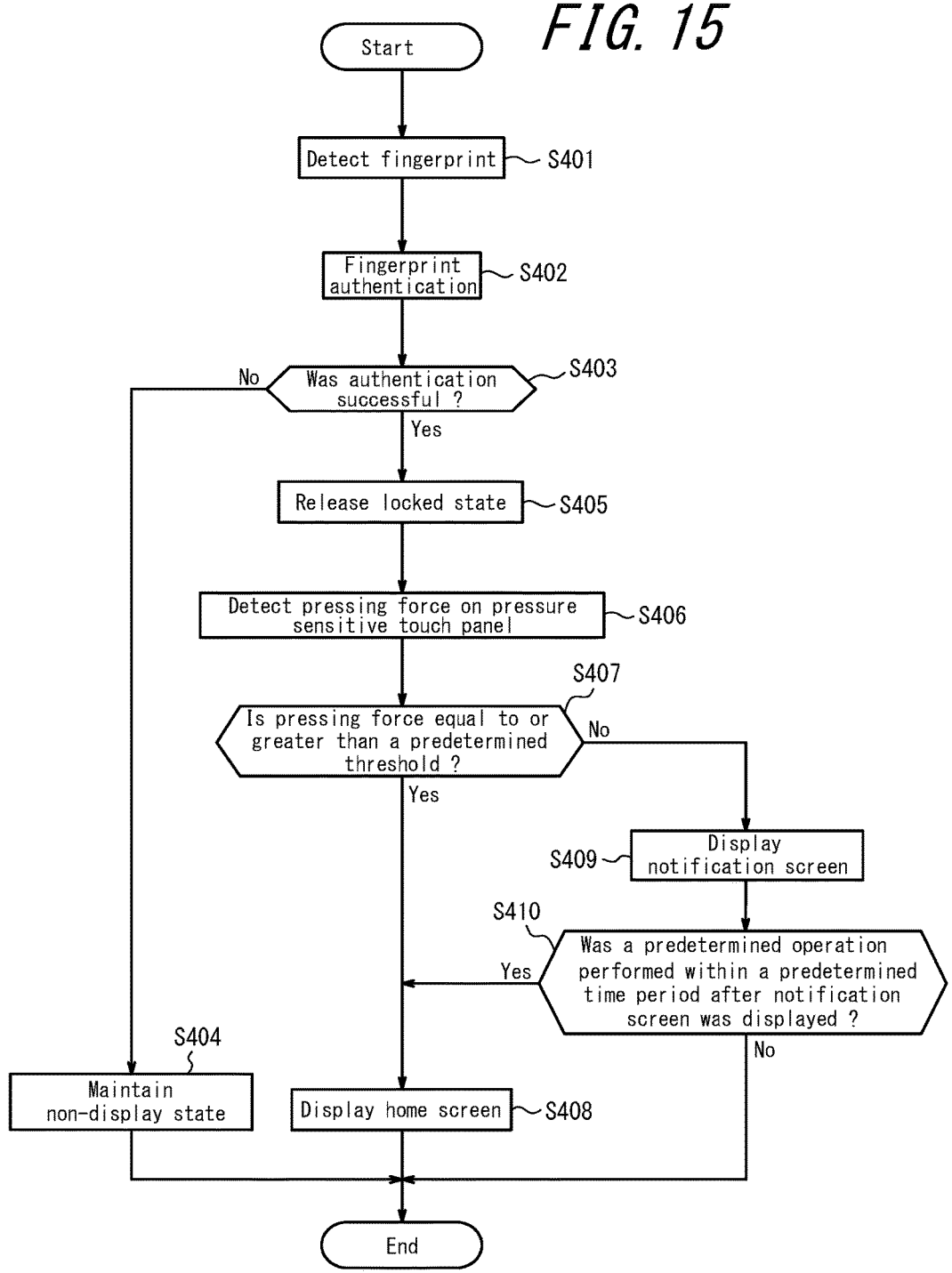

ELECTRONIC DEVICE AND CONTROL METHOD HAVING FINGERPRINT DETECTION FEATURES

CROSS-REFERENCE TO RELATED APPLICATION

The present application claims priority to and the benefit of Japanese Patent Application No. 2017-038811 filed Mar. 1, 2017, the entire contents of which are incorporated herein by reference.

TECHNICAL FIELD

The present disclosure relates to an electronic device and a control method.

BACKGROUND

An electronic device that includes a fingerprint sensor for detecting a user's fingerprint is known. For example, an electronic device known in the art including a button and a fingerprint sensor built into the button. While displaying a lock screen indicating that operations on the electronic device are restricted, the electronic device releases the restriction when fingerprint information detected by the fingerprint sensor matches preregistered fingerprint information.

SUMMARY

An electronic device according to an aspect of the present disclosure includes a push button, a fingerprint sensor, and a controller. The fingerprint sensor is configured to detect a fingerprint of a finger contacting the push button. The controller is configured to release a locked state when it is determined that the push button has been pressed and that the fingerprint detected by the fingerprint sensor matches preregistered fingerprint information.

An electronic device according to an aspect of the present disclosure includes a display, a fingerprint sensor, a pressure sensor, and a controller. The fingerprint sensor is configured to detect a fingerprint of a finger contacting the display. The pressure sensor is configured to measure a pressure of the finger. The controller displays a notification screen displaying notification information on the display when it is determined that the pressure is less than a predetermined threshold and that the fingerprint detected by the fingerprint sensor matches preregistered fingerprint information. The controller displays a home screen allowing execution of functions on the display when it is determined that the pressure is equal to or greater than the predetermined threshold and that the fingerprint detected by the fingerprint sensor matches the preregistered fingerprint information.

A control method according to an aspect of the present disclosure is for an electronic device comprising an push button and a fingerprint sensor configured to detect a fingerprint of a finger contacting the push button. The control method comprises releasing a locked state when it is determined that the push button has been pressed and that the fingerprint detected by the fingerprint sensor matches preregistered fingerprint information.

BRIEF DESCRIPTION OF THE DRAWINGS

In the accompanying drawings:

FIG. 15 is a flowchart illustrating an example of processing executed by the controller.

DETAILED DESCRIPTION

When, for example, the fingerprint sensor built into the button detects a fingerprint upon the user pressing the button, the electronic device known in the art may verify the fingerprint with fingerprint information and execute processing (an operation) on the basis of the verification result. If the user only intended for an operation based on a press of the button to be performed, then an operation not intended by the user may be executed on the electronic device.

It would therefore be helpful to provide an electronic device and a control method that reduce the likelihood of an erroneous operation.

An electronic device and a control method according to embodiments of the present disclosure are described in detail with reference to the accompanying drawings. A smartphone is described below as an example of an electronic device.

First Embodiment

Figure 1:
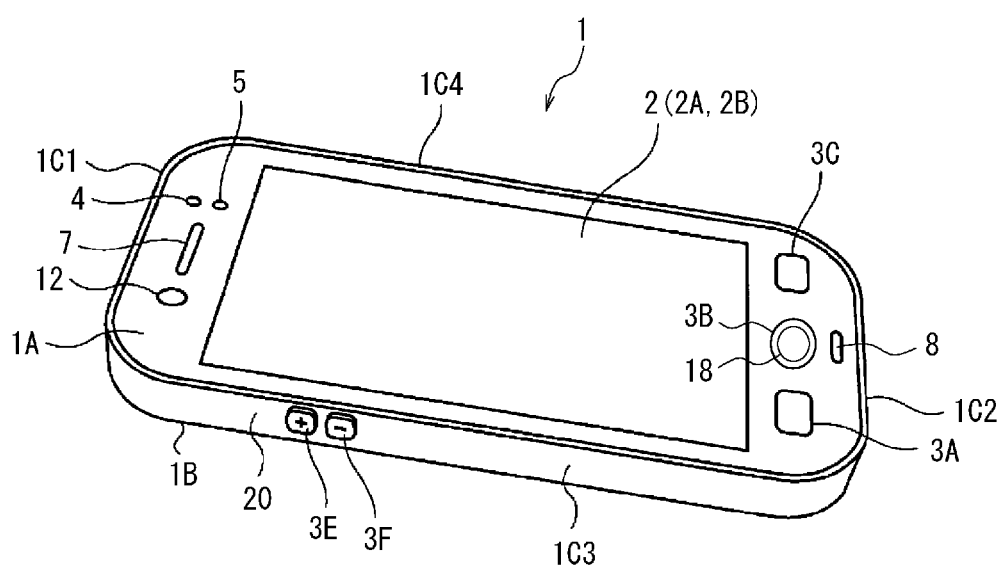
FIG. 1 is a perspective view of a smartphone according to a first embodiment.
Figure 2:
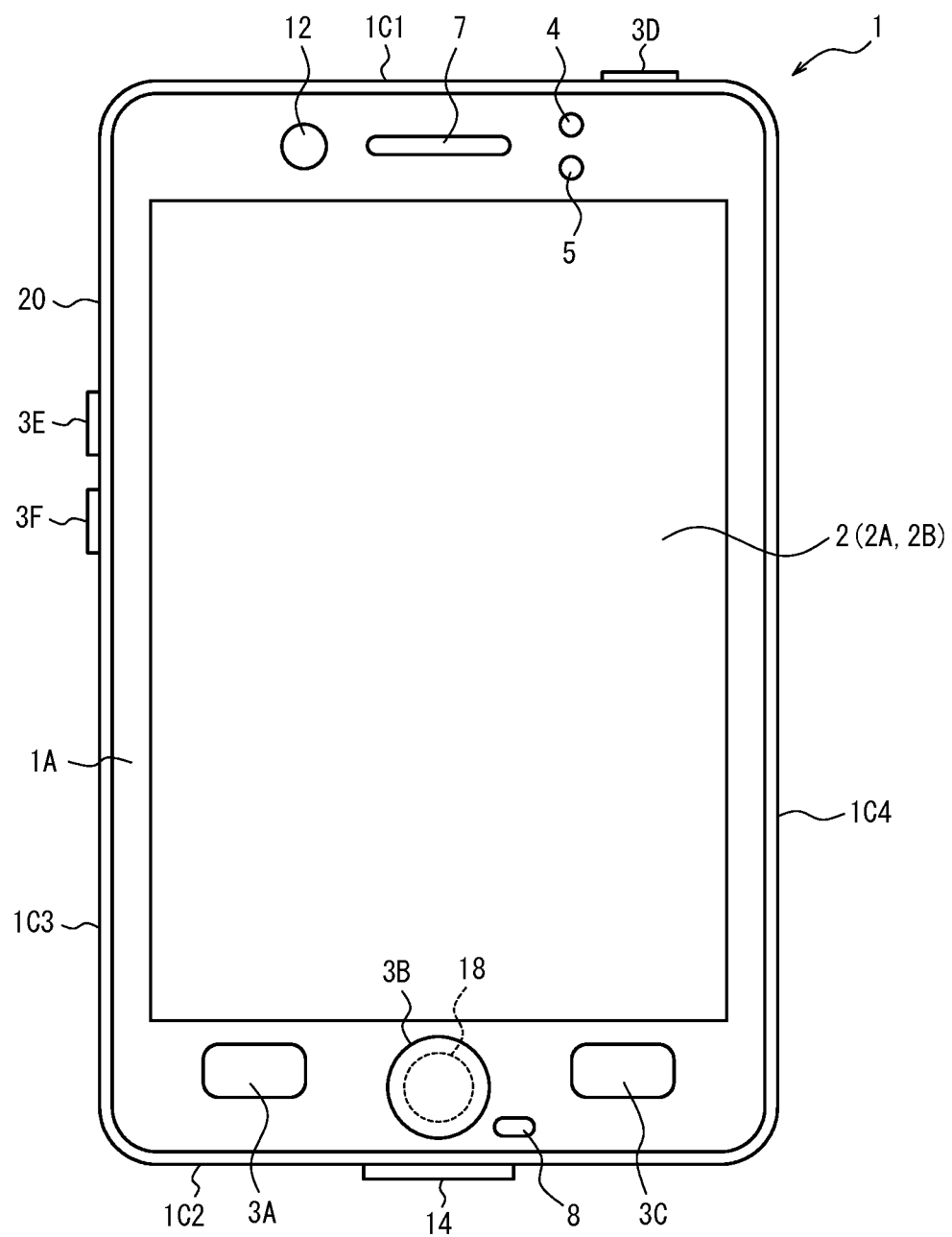
FIG. 2 is a front view of the smartphone in FIG. 1.
Figure 3:
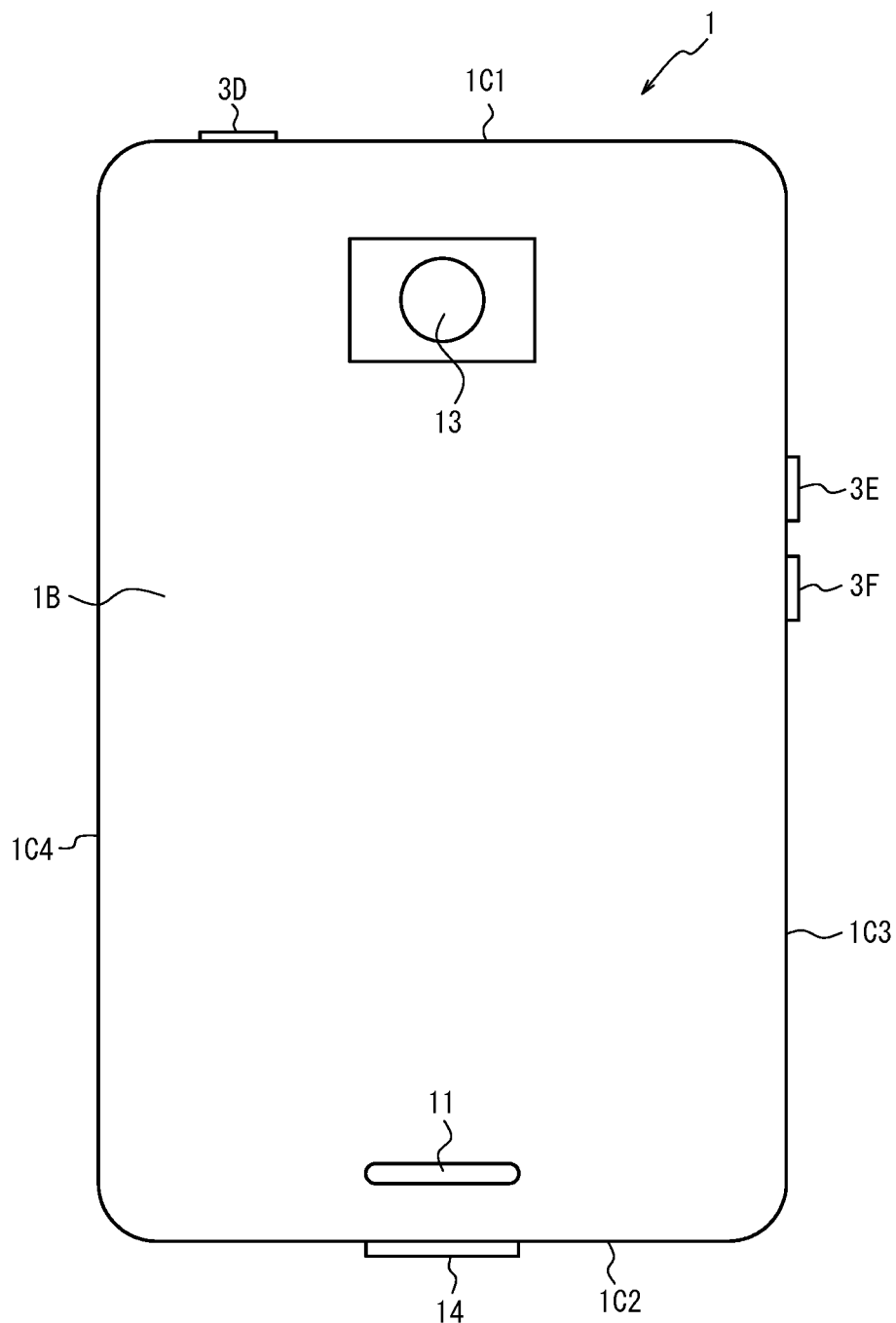
FIG. 3 is a back view of the smartphone in FIG. 1.

The overall configuration of a smartphone 1 according to the first embodiment is described with reference to FIGS. 1 to 3. As illustrated in FIGS. 1 through 3, the smartphone 1 includes a housing 20. The housing 20 includes a front face 1A, a back face 1B, and side faces 1C1 to 1C4. The front face 1A is the front surface of the housing 20. The back face 1B is the back surface of the housing 20. The side faces 1C1 to 1C4 are side surfaces that connect the front face 1A and the back face 1B. The side faces 1C1 to 1C4 may be collectively referred to below as the side faces 1C without further distinction.

On the front face 1A, the smartphone 1 includes a touchscreen display 2, operation interfaces 3A to 3C, an illuminance sensor 4, a proximity sensor 5, a receiver 7, a microphone 8, a front camera 12, and a fingerprint sensor 18. The smartphone 1 includes a speaker 11 and a camera 13 on the back face 1B. The smartphone 1 also includes operation interfaces 3D to 3F and a connector 14 on the side faces 1C.

The operation interfaces 3A to 3F may be collectively referred to below as the operation interface 3 without further distinction.

The touchscreen display 2 includes a display 2A and a touchscreen 2B. In the example in FIG. 1, the display 2A and the touchscreen 2B are each substantially rectangular, but the display 2A and the touchscreen 2B are not limited to being rectangular. The display 2A and the touchscreen 2B may each have a different shape, such as a square or a circle. In the example in FIG. 1, the display 2A and the touchscreen 2B are arranged in overlap, but the display 2A and the touchscreen 2B are not limited to this arrangement. The display 2A and the touchscreen 2B may, for example, be arranged side by side or at a distance from each other. In the example in FIG. 1, the long sides of the display 2A are parallel with the long sides of the touchscreen 2B, and the short sides of the display 2A are parallel with the short sides of the touchscreen 2B, but the display 2A and the touchscreen 2B are not limited to being overlapped in this way. The display 2A and the touchscreen 2B may, for example, be arranged in overlap so that one or more sides of the display 2A is not parallel with any of the sides of the touchscreen 2B.

The display 2A includes a display device such as a liquid crystal display (LCD), an organic electro-luminescence display (OELD), or an inorganic electro-luminescence display (IELD). The display 2A displays information such as letters, images, symbols, and graphics.

The touchscreen 2B detects contact on the touchscreen 2B by a finger, pen, stylus, or the like. The touchscreen 2B can detect the positions on the touchscreen 2B contacted by a plurality of fingers, pens, styli, or the like. Hereinafter, the finger, pen, stylus, or the like that contacts the touchscreen 2B is also referred to as a "contacting object".

Any detection system may be used in the touchscreen 2B, such as a capacitive system, a resistive film system, a surface acoustic wave system (or an ultrasonic wave system), an infrared system, an electromagnetic induction system, or a load detection system. For the sake of simplicity, it is assumed below that the user touches a finger to the touchscreen 2B to operate the smartphone 1.

The smartphone 1 determines gestures on the basis of at least one of contact detected by the touchscreen 2B, the position of the detected contact, a change in the position of the detected contact, the interval between detections of contact, and the number of times contact is detected. A gesture is an operation on the touchscreen 2B. Gestures that can be distinguished by the smartphone 1 include, but are not limited to, a touch, a long touch, a release, a swipe, a tap, a double tap, a long tap, a drag, a flick, a pinch-in, and a pinch-out, for example.

The smartphone 1 operates in accordance with these gestures that are distinguished via the touchscreen 2B. The smartphone 1 thus implements an intuitive, easy-to-use interface for the user. The operations performed by the smartphone 1 in accordance with the distinguished gestures may differ in accordance with the screen being displayed on the display 2A. For the sake of simplicity, "the touchscreen 2B detects contact, and the smartphone 1 determines the type of gesture to be X on the basis of the detected contact" is also referred to below as "the smartphone detects X", or as "the controller detects X".

The fingerprint sensor 18 scans (detects) the fingerprint at a fingertip as an image. In the present embodiment, the fingerprint sensor 18 is built into the operation interface 3B. The fingerprint sensor 18 of the present embodiment can therefore detect the fingerprint of a finger touching the operation interface 3B. The fingerprint sensor 18 outputs the scanned image as fingerprint information. When, for example, the fingerprint sensor 18 is a semiconductor sensor, the fingerprint sensor 18 detects the charge, of a plurality of electrodes, that changes due to the unevenness of a fingerprint. The fingerprint sensor 18 then converts the amount of charge into an image. The fingerprint sensor 18 is not limited to a semiconductor sensor and may instead be an optical sensor or an ultrasonic sensor. The fingerprint sensor 18 is described as being built into the operation interface 3B in the present embodiment, but this configuration is not limiting. For example, the fingerprint sensor 18 may be provided independently on the front face 1A or the side faces 1C3, 1C4 or the like of the housing 20 within a range operable by the thumb when the user holds the smartphone 1 in one hand. The fingerprint sensor 18 may, for example, operate intermittently. The fingerprint sensor 18 may, for example, activate and operate when a predetermined condition is satisfied, such as the display 2A turning on in response to the operation interface 3 being pressed.

The operation interfaces 3 are operation buttons operated by the user. The operation interfaces 3 are disposed on the housing 20 so as to be pressable by the user. The operation interfaces 3 include operation interfaces 3A to 3F. A controller 10 cooperates with the operation interfaces 3 to detect operations on the operation interfaces 3. The operations on the operation interfaces 3 include, but are not limited to, a click, a double-click, a triple-click, and a push, for example.

The operation interfaces 3A to 3C are, for example, a home button, a back button, or a menu button. The operation interface 3D is, for example, a power button for the smartphone 1. By operating (pressing) the operation interface 3D, the user can switch the display of the display 2A on and off. The operation interface 3D may also serve as a button to enable/disable a sleep mode. The operation interfaces 3E and 3F are, for example, volume buttons.

The illuminance sensor 4 detects the illuminance from surrounding light around the smartphone 1. The illuminance is the value of luminous flux incident on a measurement surface of the illuminance sensor 4 per unit area. The illuminance sensor 4 may, for example, be used to adjust the luminance of the display 2A. The proximity sensor 5 detects the presence of a nearby object without contact. The proximity sensor 5 detects the presence of an object on the basis of a change in the magnetic field or a change in the time for a reflected ultrasonic wave to return. The proximity sensor 5 may, for example, detect that the touchscreen display 2 has been brought close to a face. The illuminance sensor 4 and the proximity sensor 5 may be configured as one sensor. The illuminance sensor 4 may be used as a proximity sensor.

The receiver 7 and the speaker 11 are sound output interfaces. The receiver 7 and the speaker 11 output the below-described sound signal, transmitted from the controller 10 of the smartphone 1, as sound. The receiver 7 is, for example, used to output the other party's voice during a phone call. The speaker 11 is, for example, used to output a ringtone and music. One of the receiver 7 and the speaker 11 may also serve the functions of the other. The microphone 8 is a sound input interface. The microphone 8 converts the user's speech or the like to a sound signal and transmits the sound signal to the controller 10.

The camera 12 is a front camera that images an object facing the front face 1A. The camera 13 is a back camera that images an object facing the back face 1B.

The connector 14 is a terminal to which another apparatus connects. The connector 14 may be a universal terminal such as a universal serial bus (USB) terminal, a high-definition multimedia interface (HDMI® (HDMI is a registered trademark in Japan, other countries, or both)) terminal, Light Peak (Thunderbolt (Thunderbolt is a registered trademark in Japan, other countries, or both)), or an earphone microphone connector. The connector 14 may be a dedicated terminal, such as a Dock connector. The apparatuses that may connect to the connector 14 include, but are not limited to, an external storage, a speaker, and a communication apparatus, for example.

Figure 4:
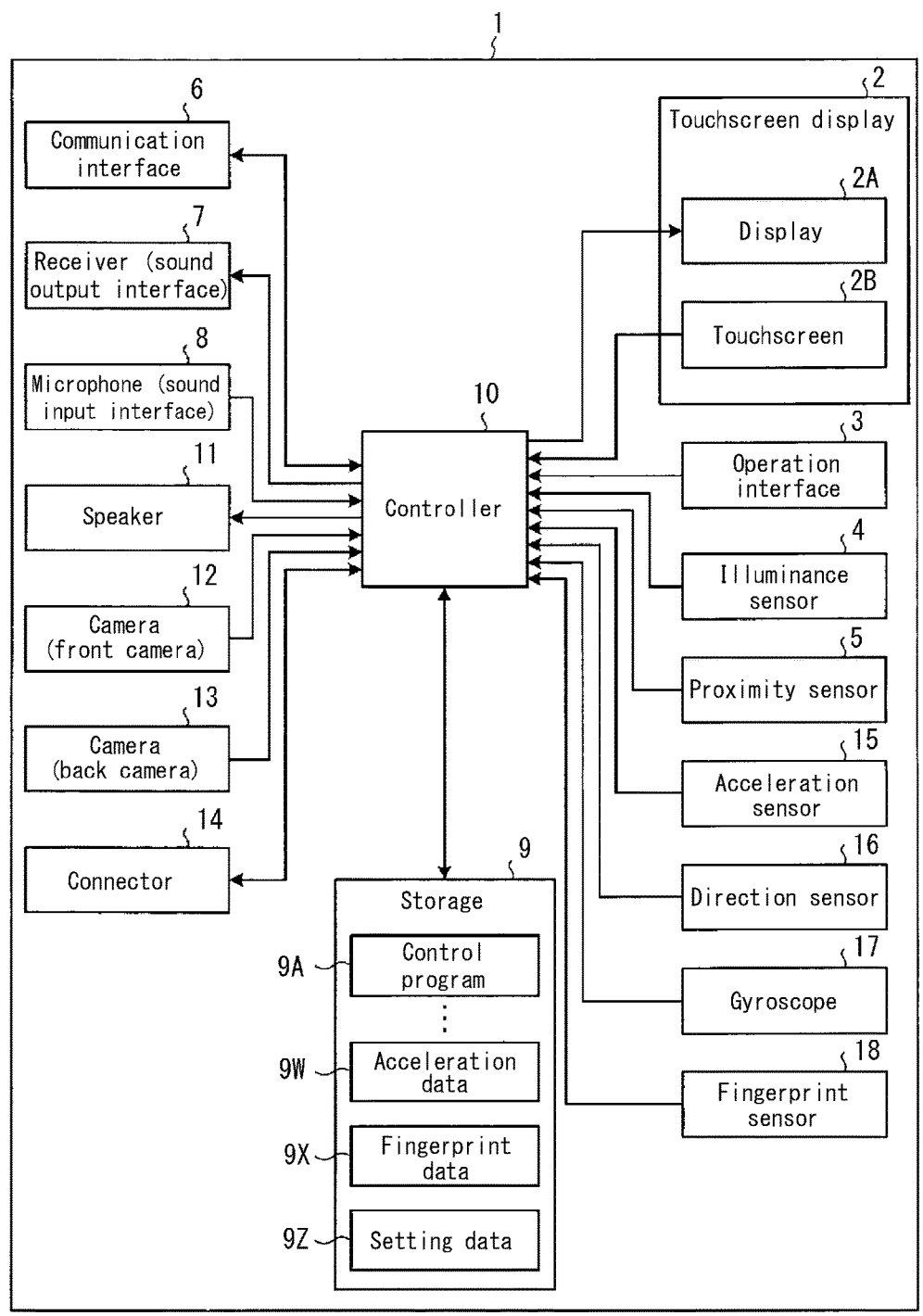
FIG. 4 is a functional block diagram illustrating an example of the configuration of the smartphone in FIG. 1.

FIG. 4 is a functional block diagram illustrating an example of the configuration of the smartphone 1. The smartphone 1 includes the touchscreen display 2, the operation interfaces 3, the illuminance sensor 4, the proximity sensor 5, a communication interface 6, the receiver 7, the microphone 8, a storage 9, the controller 10, the speaker 11, the cameras 12 and 13, the connector 14, an acceleration sensor 15, a direction sensor 16, a gyroscope 17, and the fingerprint sensor 18.

As described above, the touchscreen display 2 includes a display 2A and a touchscreen 2B. The display 2A displays information such as letters, images, symbols, and graphics. The touchscreen 2B detects contact. The controller 10 detects a gesture on the smartphone 1. Specifically, the controller 10 cooperates with the touchscreen 2B to detect an operation (gesture) on the touchscreen 2B (touchscreen display 2).

The communication interface 6 communicates wirelessly. The communication method supported by the communication interface 6 is prescribed by a wireless communication standard. For example, a cellular phone communication standard such as 2G, 3G, or 4G may be used as the wireless communication standard. Examples of cellular phone communication standards include long term evolution (LTE), wideband code division multiple access (W-CDMA), CDMA2000, personal digital cellular (PDC), global system for mobile communications (GSM® (GSM is a registered trademark in Japan, other countries, or both)), and personal handy-phone system (PHS). Further examples of wireless communication standards include worldwide interoperability for microwave access (WiMAX), IEEE802.11, Bluetooth® (Bluetooth is a registered trademark in Japan, other countries, or both), infrared data association (IrDA), and near field communication (NFC). The communication interface 6 may support one or more of the aforementioned communication standards.

The receiver 7 and the speaker 11 are sound output interfaces. The receiver 7 and the speaker 11 output sound signals, transmitted from the controller 10, as sound. The receiver 7 is, for example, used to output the other party's voice during a phone call. The speaker 11 is, for example, used to output a ringtone and music. One of the receiver 7 and the speaker 11 may also serve the functions of the other. The microphone 8 is a sound input interface. The microphone 8 converts the user's speech or the like to a sound signal and transmits the sound signal to the controller 10.

The storage 9 stores programs and data. The storage 9 may also be used as a working area to store results of processing by the controller 10 temporarily. The storage 9 may include any non-transitory storage medium, such as a semiconductor storage medium or a magnetic storage medium. The storage 9 may also include a plurality of types of storage media. The storage 9 may include a combination of a portable storage medium, such as a memory card, optical disc, or magneto-optical disc, and an apparatus for reading the storage medium. The storage 9 may include a storage device used as a temporary storage area, such as random access memory (RAM).

The programs stored on the storage 9 include applications that run in the foreground or the background and a control program that supports operations of the applications. The applications may, for example, cause a screen to be displayed on the display 2A and cause the controller 10 to execute processing in accordance with a gesture detected via the touchscreen 2B. The control program may, for example, be an operating system (OS). The applications and the control program may be installed on the storage 9 through wireless communication by the communication interface 6 or from a non-transitory storage medium.

The storage 9 stores a control program 9A, acceleration data 9W, fingerprint data 9X, and setting data 9Z, for example. The acceleration data 9W includes information on acceleration acting on the smartphone 1. The fingerprint data 9X includes information related to fingerprints registered by the user who owns the smartphone 1. The setting data 9Z includes information related to various settings for operation of the smartphone 1.

The control program 9A provides functions related to various types of control which enable the smartphone 1 to operate. The control program 9A may, for example, place a phone call by controlling components such as the communication interface 6, receiver 7, and microphone 8. The functions provided by the control program 9A include functions for performing various types of control, such as changing information displayed on the display 2A in accordance with a gesture detected via the touchscreen 2B. The functions provided by the control program 9A may be used in combination with functions provided by other programs.

The control program 9A provides a function that restricts receipt of at least a subset of operations in respect of the touchscreen display 2, the operation interfaces 3, and the like. In the present disclosure, the function to restrict receipt of at least a subset of operations is also referred to as a "lock function". A state in which receipt of at least a subset of operations is restricted is referred to as a "locked state", and a state in which the locked state is released and receipt of operations is not restricted is referred to as an "unlocked state". Once the unlocked state is entered by virtue of the locked state being released, operations in respect of the touchscreen display 2, operation interfaces 3, and the like become possible, allowing the functions of the smartphone 1 to be used.

The control program 9A implements a function to release the locked state on the basis of a predetermined operation or the like input to the smartphone 1. Details of the predetermined operation for releasing the locked state and of the specific processing are provided below.

The control program 9A provides a function for user authentication. The authentication function encompasses, for example, authentication by the user's fingerprint and authentication by input of a personal identification number (PIN).

Authentication by a fingerprint is for authenticating the user as a registered person when the fingerprint information scanned by the fingerprint sensor 18 matches the preregistered fingerprint information within a predetermined range. Matching within a predetermined range refers, for example, to using image processing to evaluate the consistency between the scanned fingerprint image and a preregistered fingerprint image of the thumb and determining that the images match when the consistency is evaluated at a predetermined level or higher. Image processing includes, for example, processing to extract and compare feature points of a fingerprint. In the present disclosure, the determination that the fingerprint information scanned by the fingerprint sensor 18 matches the preregistered fingerprint information within a predetermined range is also referred to as "authentication being successful". In the present disclosure, the determination that the fingerprint information scanned by the fingerprint sensor 18 does not match the preregistered fingerprint information within a predetermined range is also referred to as "authentication failing".

Authentication by input of a PIN is for authenticating the user as the registered person when the entered PIN matches the preregistered PIN.

The control program 9A provides a function to authenticate the user on the basis of fingerprint information once the fingerprint information is output by the fingerprint sensor 18 during a state of restricted use. For example, when the fingerprint information scanned by the fingerprint sensor 18 matches the preregistered fingerprint information within a predetermined range, the control program 9A determines that the user operating the smartphone 1 is a registered user and performs predetermined control in accordance with the determination result. Details of the control that the control program 9A performs in accordance with the determination result are provided below.

A plurality of pieces of acceleration information received as the detection result of the acceleration sensor 15 are stored chronologically in the acceleration data 9W. The acceleration information includes items such as the time and the value of acceleration. The time indicates the time at which the acceleration was detected by the acceleration sensor 15. The value of acceleration indicates the value of the acceleration detected by the acceleration sensor 15.

The fingerprint data 9X includes fingerprint information indicating an image of a fingerprint preregistered by the user. In the case of fingerprints of a plurality of fingers being registered, the fingerprint data 9X includes fingerprint information for each of the plurality of fingers. For example, in the case of fingerprints of the thumb and index finger being registered, the fingerprint data 9X includes two pieces of fingerprint information corresponding to the thumb and the index finger. In the fingerprint data 9X, fingerprint information is associated with information indicating the type of finger and hand. For example, in the case of the fingerprint of the thumb of the right hand being registered, information indicating the right hand and the thumb is associated with the fingerprint information in the fingerprint data 9X.

The controller 10 is an arithmetic processing unit. The arithmetic processing unit encompasses, for example, a central processing unit (CPU), a system-on-a-chip (SOC), a micro control unit (MCU), a field-programmable gate array (FPGA), and a coprocessor. However, the arithmetic processing unit is not limited to these examples. The controller 10 may include a plurality of arithmetic processing units. The controller 10 implements a variety of functions by comprehensively controlling operations of the smartphone 1.

In greater detail, the controller 10 executes commands included in the programs stored in the storage 9 while referring as necessary to data stored in the storage 9. The controller 10 thus controls functional components in accordance with data and instructions, thereby implementing various functions. The functional components include, but are not limited to, the display 2A, communication interface 6, receiver 7, and speaker 11, for example. The controller 10 may change the control in response to detection results from detectors. The detectors include, but are not limited to, the touchscreen 2B, operation interfaces 3, illuminance sensor 4, proximity sensor 5, microphone 8, camera 12, camera 13, acceleration sensor 15, direction sensor 16, gyroscope 17, and fingerprint sensor 18, for example.

By executing the control program 9A, for example, the controller 10 executes various types of control, such as changing information displayed on the display 2A in accordance with a gesture detected via the touchscreen 2B.

The acceleration sensor 15 detects the magnitude and direction of acceleration acting on the smartphone 1, the angle of inclination of the smartphone 1, and the magnitude and direction of gravitational acceleration. The direction sensor 16 detects the orientation of the earth's magnetic field. The gyroscope 17 detects the angle and the angular velocity of the smartphone 1. The detection results of the acceleration sensor 15, direction sensor 16, and gyroscope 17 are used in combination to detect changes in the position, orientation, and state of the smartphone 1.

A portion or all of the programs and data stored in the storage 9 in FIG. 4 may be downloaded by the communication interface 6 from another apparatus by wireless communication. A portion or all of the programs and data stored in the storage 9 in FIG. 4 may also be stored in a non-transitory storage medium that is readable by a reading apparatus included in the storage 9. A portion or all of the programs and data stored in the storage 9 in FIG. 4 may also be stored in a non-transitory storage medium that is readable by a reading apparatus connected to the connector 14. Non-limiting examples of the non-transitory storage medium include optical discs such as a compact disc (CD®), digital versatile disc (DVD®), and Blu-ray® (CD, DVD, and Blu-ray are registered trademarks in Japan, other countries, or both), magneto-optical discs, magnetic storage media, memory cards, and solid-state storage media.

The configuration of the smartphone 1 illustrated in FIG. 1 through FIG. 4 is only an example and may be changed as necessary without departing from the scope of the present disclosure. For example, the number and type of operation interfaces 3 are not limited to the example in FIG. 1 through FIG. 4. Instead of the operation interfaces 3A to 3C, the smartphone 1 may include buttons arranged as a numeric keypad, a QWERTY keyboard, or another arrangement as buttons for operations related to the screen. The smartphone 1 may also include only one operation interface for operations related to the screen. The smartphone 1 includes two cameras in the example illustrated in FIG. 4, but the smartphone 1 may include just one camera or may lack cameras altogether. The smartphone 1 includes four types of sensors for detecting position and orientation in the example illustrated in FIG. 4, but the smartphone 1 need not include all of these sensors. The smartphone 1 may also include another type of sensor for detecting at least one of position and orientation.

Next, an example of a screen displayed on the display 2A is described. The display 2A can display two types of screens, a notification screen and a home screen, under control by the controller 10 on the basis of user operation.

Figure 5:
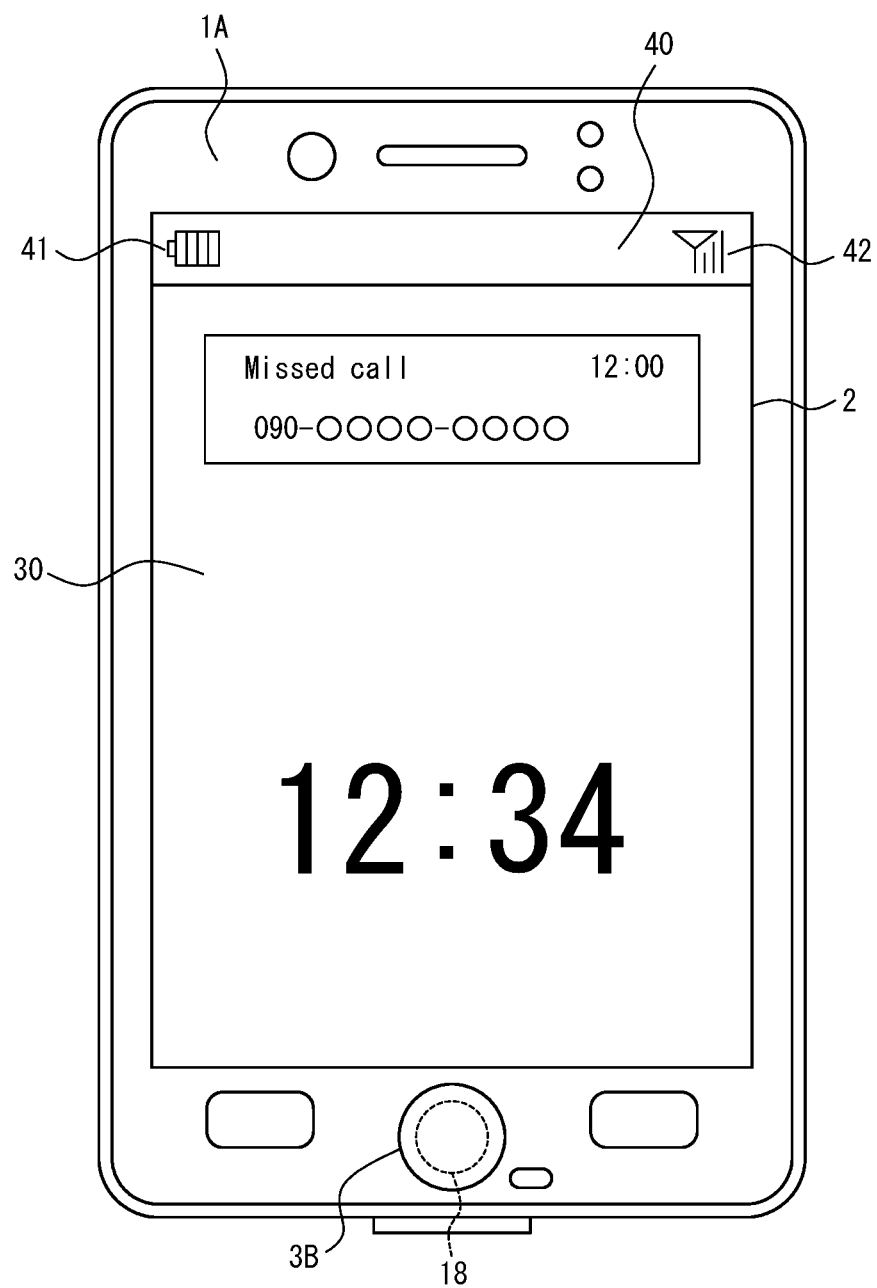
FIG. 5 illustrates an example of a notification screen displayed on a display.

FIG. 5 illustrates an example of a notification screen. The notification screen 30 is a screen that allows viewing of notification information. As illustrated in FIG. 5, the notification screen 30 displays the time, for example, as notification information. An area 40 is provided in a portion of the notification screen 30 (the upper end in FIG. 5). In the area 40, a battery indicator 41 indicating the remaining charge of the battery of the smartphone 1 and a radio wave level indicator 42 indicating the field strength of radio waves for communication by the communication interface 6 are displayed as notification information. The notification information may, for example, include information indicating receipt of a phone call, whether there is an unread message (unread e-mail or the like), information on the number of messages and/or the subject, news headlines, information on an application update, and the like. The user performs an operation to display the notification screen 30 on the display 2A when, for example, wishing to confirm notification information. The user can see notification information on the notification screen 30 displayed on the display 2A.

Figure 6:
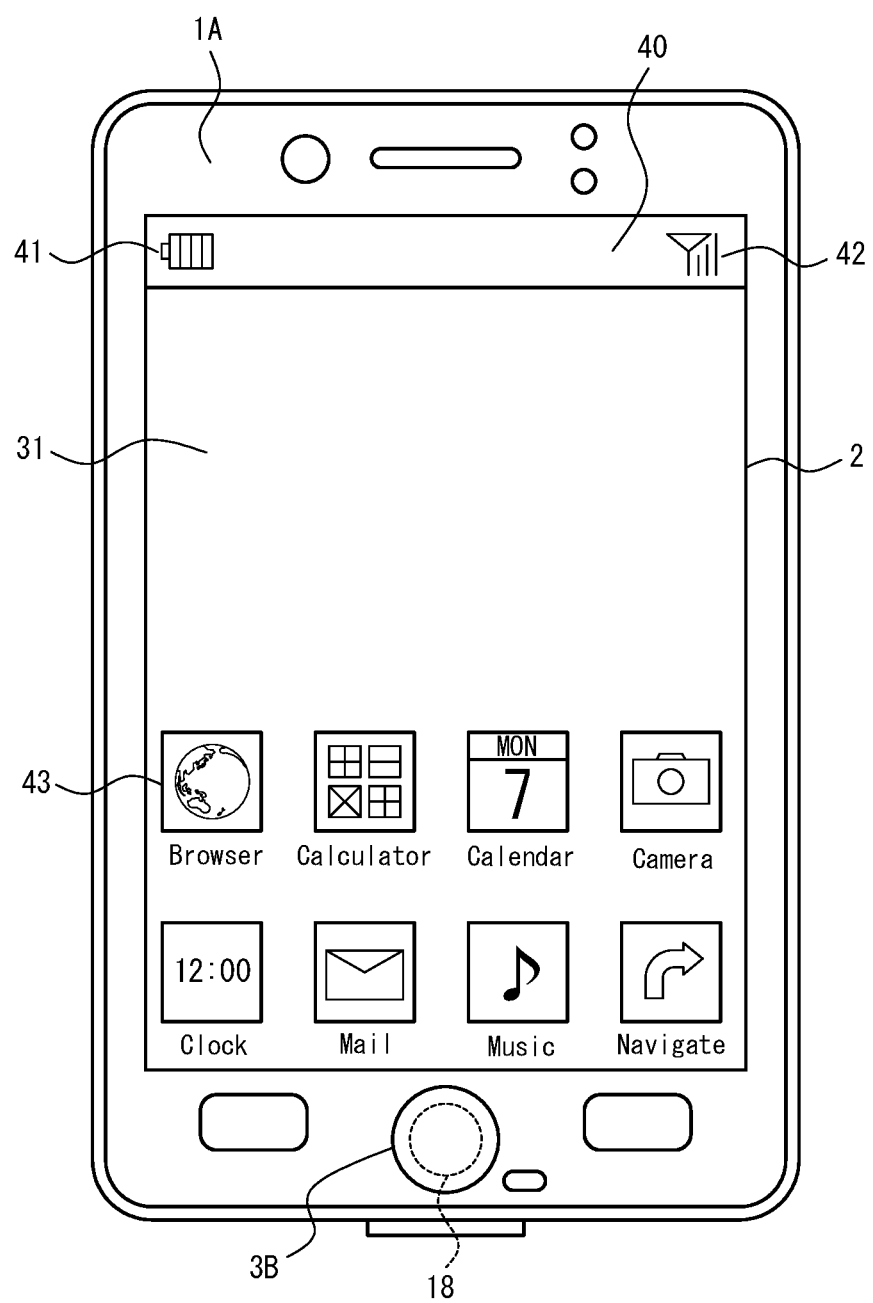
FIG. 6 illustrates an example of a home screen displayed on the display.

FIG. 6 illustrates an example of a home screen. The home screen 31 is a screen displayed while in a state where various functions can be executed on the smartphone 1. As illustrated in FIG. 6, the home screen 31 is a screen for the user to select which application to execute from among applications installed on the smartphone 1. As illustrated in FIG. 6, icons indicating applications executable by the smartphone 1 are displayed on the home screen 31. An area 40 is provided in a portion of the home screen, as on the notification screen 30. The battery indicator 41 and the radio wave level indicator 42 are displayed in the area 40. When, for example, the user wishes to use an application installed on the smartphone 1, the user can perform an operation to display the home screen 31 on the display 2A and then perform an operation for using the applications displayed on the home screen 31.

The smartphone 1 may include a plurality of home screens. The smartphone 1 determines the number of home screens in accordance with a setting made by the user, for example. When including a plurality of home screens, the smartphone 1 displays one selected home screen, for example, on the display 2A.

The notification screen 30 of FIG. 5 and the home screen 31 of FIG. 6 are only examples, and the form, arrangement, and the like of various elements are not limited to the above explanation.

The controller 10 displays the notification screen 30 or the home screen 31 in accordance with user operation of the smartphone 1, the verification result for a fingerprint, and the like.

In a known smartphone, a notification screen is displayed on the display when an operation interface is pressed during, for example, a state in which the display is off, i.e. while no screen is being displayed on the display (non-display state). The notification screen is displayed in a state in which the smartphone is locked. In a known smartphone, the home screen is displayed on the display when, for example, authentication by a fingerprint is successful while the notification screen is displayed on the display. The home screen is displayed in an unlocked state. In other words, when wishing to display the notification screen on a known smartphone, the user presses the operation interface, and when wishing to display the home screen, the user performs an operation for authentication by a fingerprint after pressing the operation interface (an operation to cause the fingerprint sensor to detect a fingerprint).

However, if the fingerprint sensor is disposed inside the operation interface, for example, then the fingerprint sensor may detect a fingerprint, the controller may determine that authentication is successful, and the home screen may be displayed on the display, even when the user's only intention upon pressing the operation interface was to cause the notification screen to be displayed. In this case, the operation of displaying the home screen is not intended by the user and represents a an erroneous operation, since the operation intended by the user is an operation to cause the notification screen to be displayed. Furthermore, the user also does not intend to release the lock, since the user does not intend to display the home screen. However, the lock is unintentionally released, since authentication is determined to be successful. Such unintentional release is undesirable in terms of information security.

The smartphone 1 according to the present embodiment performs control that facilitates prevention of such an erroneous operation. The control performed by the controller 10 of the smartphone 1 is described below along with screens displayed on the display 2A. In the present embodiment, the fingerprint sensor 18 operates intermittently.

In the present embodiment, the controller 10 releases the locked state when it is determined that the operation interface 3B was pressed and it is determined that the fingerprint detected by the fingerprint sensor 18 matches fingerprint information preregistered in the storage 9 as the fingerprint data 9X. In this case, the controller 10 displays the home screen 31.

Figure 7:
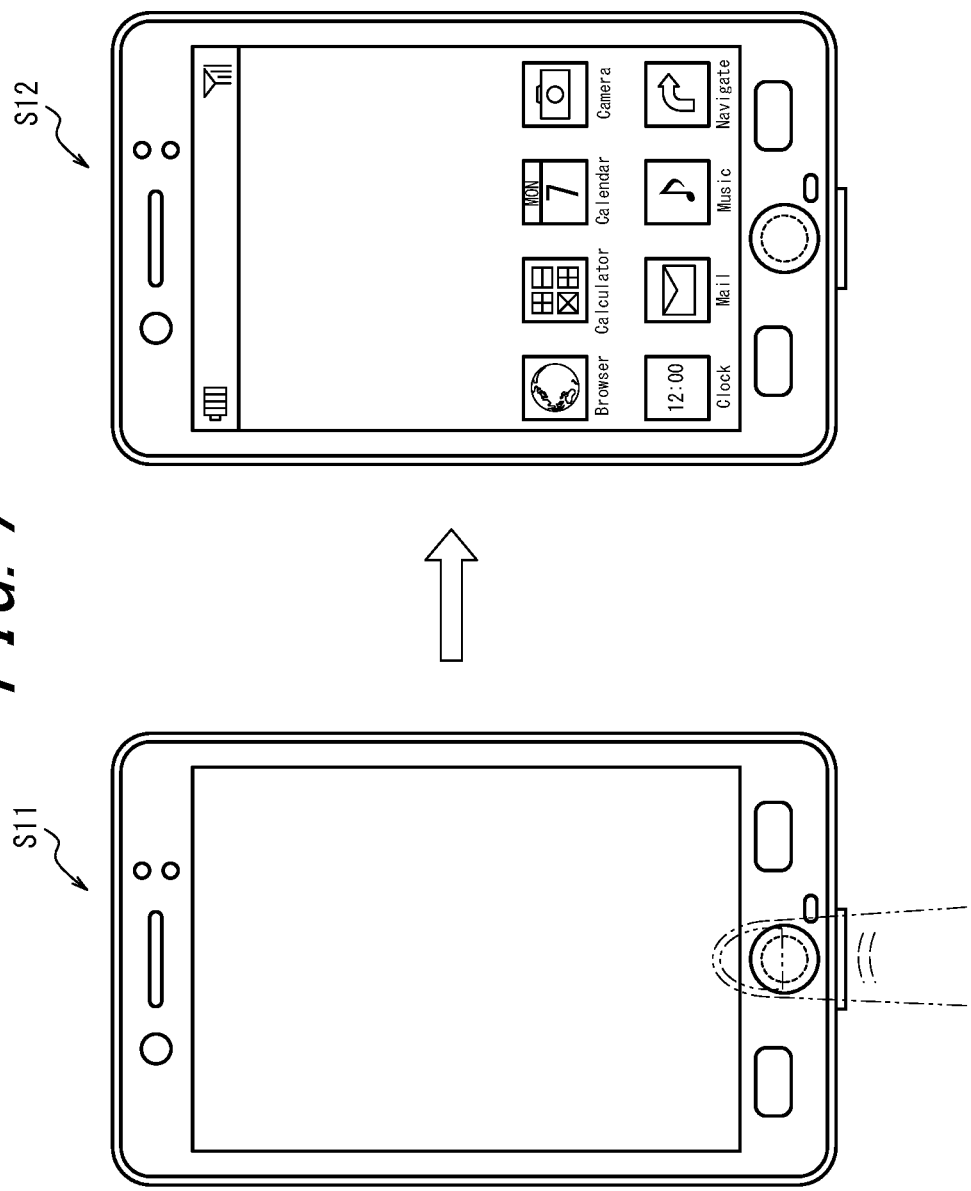
FIG. 7 illustrates an example of a transition of the screen displayed on the display.

FIG. 7 illustrates an example of a transition of the screen displayed on the display 2A, illustrating an example of a transition from the non-display state. As illustrated in step S11, suppose that the user presses the operation interface 3B with a finger while the display 2A is in the non-display state. In this case, the controller 10 detects that the operation interface 3B was pressed. The controller 10 also detects the fingerprint of the finger pressing the operation interface 3B with the fingerprint sensor 18. The controller 10 verifies the fingerprint detected by the fingerprint sensor 18 against fingerprint information preregistered as the fingerprint data 9X. The controller 10 releases the locked state when it is determined that the fingerprint detected by the fingerprint sensor 18 matches the fingerprint information preregistered as the fingerprint data 9X, i.e. when authentication is successful. At this time, the controller 10 displays the home screen 31 on the display 2A, as illustrated in step S12.

The controller 10 may release the locked state when detecting that a predetermined operation has been performed, instead of detecting a press of the operation interface 3B, and detecting that authentication was successful. The predetermined operation may be any operation detectable by the controller 10. For example, the predetermined operation may be a gesture operation on the touchscreen display 2. The gesture operation may, for example, include a touch, a swipe, a tap, a double tap, a flick, and the like. When, for example, the fingerprint sensor 18 is a capacitive system, the predetermined operation may be a finger flick or the like on the fingerprint sensor 18.

The predetermined operation may, for example, be an operation to change the orientation of the smartphone 1. In this case, the predetermined operation includes, for example, an operation to rotate the smartphone 1 by a predetermined angle (for example, 45 or 90 degrees) to change from a state in which the long sides of the display 2A are in the vertical direction to a state in which the short sides of the display 2A are in the vertical direction. This operation can, for example, be detected by the acceleration sensor 15, the direction sensor 16, the gyroscope 17, or the like. The operations listed here are only examples of the predetermined operation. The predetermined operation is not limited to the above-described examples.

In the present embodiment, the controller 10 displays the notification screen 30 when it is determined that the operation interface 3B has not been pressed and it is determined that the fingerprint detected by the fingerprint sensor 18 matches fingerprint information preregistered in the storage 9 as the fingerprint data 9X.

Figure 8:
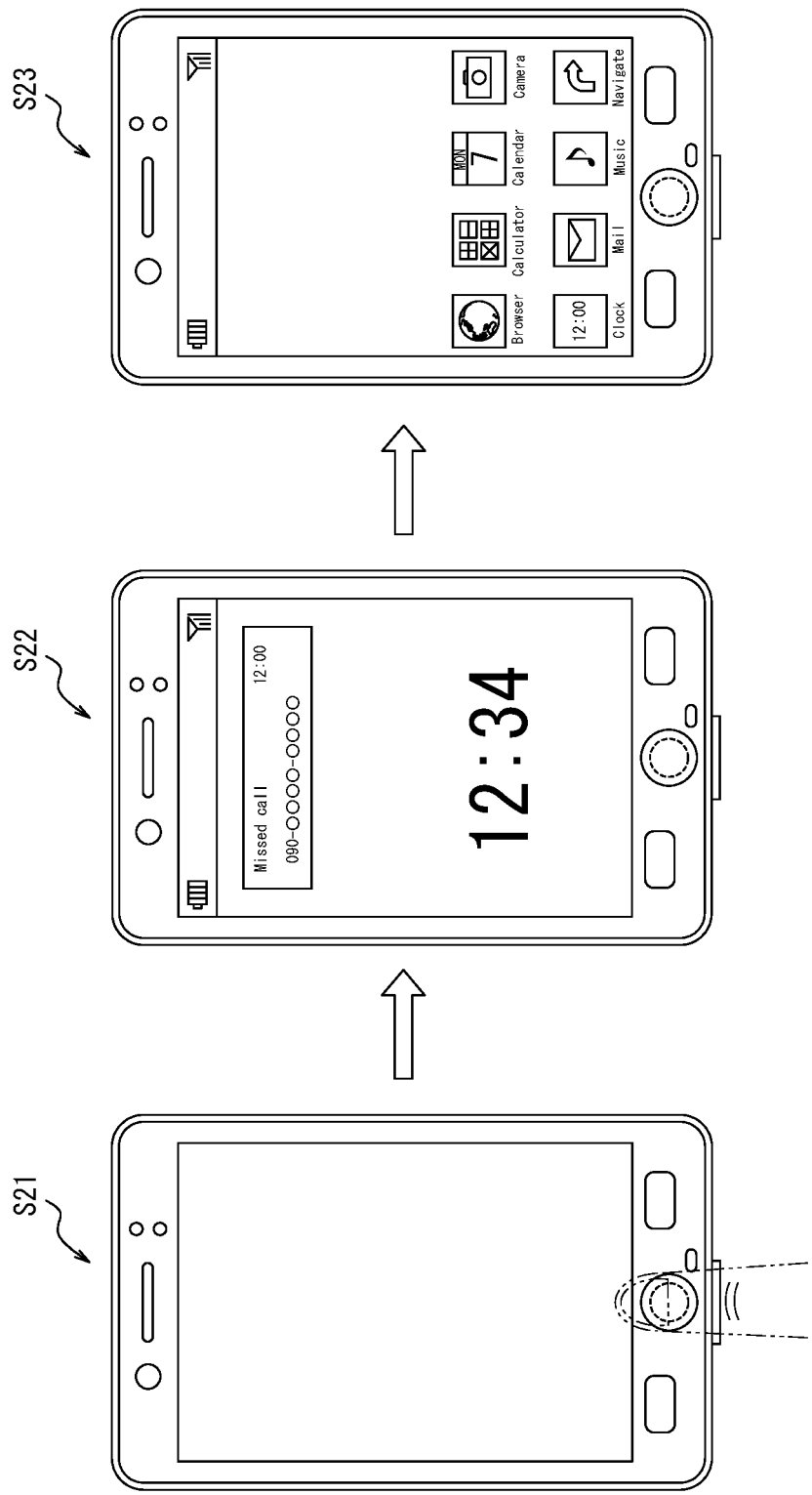
FIG. 8 illustrates an example of transitions of the screen displayed on the display.

FIG. 8 illustrates an example of transitions of the screen displayed on the display 2A, illustrating an example of a transition from the non-display state. Suppose the user places a finger on the operation interface 3B without pressing the operation interface 3B while the display 2A is in the non-display state, as illustrated in step S21. In this case, a press on the operation interface 3B is not detected. The controller 10 does, however, detect the fingerprint of the finger pressing the operation interface 3B with the fingerprint sensor 18. The controller 10 verifies the fingerprint detected by the fingerprint sensor 18 against fingerprint information preregistered as the fingerprint data 9X. The controller 10 displays the notification screen 30 on the display 2A, as illustrated in step S22, when it is determined that the fingerprint detected by the fingerprint sensor 18 matches the fingerprint information preregistered as the fingerprint data 9X, i.e. when authentication is successful. The controller 10 may, as internal processing, release the locked state of the smartphone 1 when authentication is successful in this way.

When the notification screen 30 is displayed on the display 2A in this way, the controller 10 displays the home screen 31 on the display 2A, as illustrated in step S23, upon predetermined operation input being provided by the user. The locked state is released as internal processing when the notification screen 30 is displayed, as described above. The controller 10 can therefore cause the screen displayed on the display to transition from the notification screen 30 to the home screen 31 when predetermined operation input is provided, without authenticating the fingerprint. In other words, when the notification screen 30 is displayed on the smartphone 1, the user who is operating the smartphone 1 has been confirmed as being a user with a preregistered fingerprint. Therefore, it can be confirmed that the owner of the smartphone 1, for example, is operating the smartphone 1 even if the home screen 31 is displayed without authenticating the fingerprint again. Since the smartphone 1 according to the present embodiment does not execute the internal processing of verifying the fingerprint when transitioning in this way from the notification screen 30 to the home screen 31, the transition to the home screen 31 is, for example, faster than on a smartphone that verifies the fingerprint when transitioning from the notification screen to the home screen. After fingerprint authentication is successful, the fingerprint sensor 18 may suspend the operation to detect a fingerprint until a predetermined time period has elapsed. After fingerprint authentication is successful, the controller 10 may also maintain the state of successful fingerprint authentication and suspend the operation to authenticate a fingerprint until the predetermined time period has elapsed.

After fingerprint authentication is successful and the controller 10 causes the notification screen 30 to be displayed on the display 2A, the controller 10 may display the home screen 31 on the display 2A as illustrated in step S23 when the aforementioned predetermined operation is performed within a predetermined time period. In this case, the controller 10 does not display the home screen 31 after the predetermined time period has elapsed, even if the predetermined operation is performed. For example, it is assumed that within a certain time period after fingerprint authentication is successful, the user for whom authentication was successful will use the smartphone 1, whereas after a certain time period elapses, the user may have finished using the smartphone 1. In this case, a third party other than the user could cause the home screen 31 to be displayed on the display 2A by performing the aforementioned predetermined operation on the smartphone 1 and could then use applications on the smartphone 1 and view information stored in the storage 9. Having the controller 10 display the home screen 31 on the display 2A only when the predetermined operation is performed within a predetermined time period facilitates prevention of such use by a third party.

The predetermined operation that the user performs to cause the home screen 31 to be displayed on the display 2A may include a press of the operation interface 3, a gesture on the touchscreen display 2, a flick of a finger on the fingerprint sensor 18, and a change in the orientation of the smartphone 1, as described above.

The controller 10 may cause the home screen 31 to be displayed on the display 2A when, for example, predetermined sound input is detected with the microphone 8, instead of when the predetermined operation is detected. For example, assume that the user speaks words such as "home screen". The words spoken by the user are detected as sound by the microphone 8. The controller 10 may perform speech analysis on the sound detected by the microphone 8 and cause the home screen 31 to be displayed on the display 2A when recognizing that predetermined words (here, the words "home screen") were spoken.

In the present embodiment, the controller 10 may maintain the screen in the non-display state when detecting a fingerprint with the fingerprint sensor 18 and determining that the fingerprint detected by the fingerprint sensor 18 does not match the fingerprint information preregistered in the storage 9 as the fingerprint data 9X, i.e. when authentication fails. When the fingerprint detected by the fingerprint sensor 18 does not match the fingerprint information preregistered in the storage 9 as the fingerprint data 9X, it is assumed that a third party that does not own the smartphone 1 is attempting to operate the smartphone 1. The controller 10 can therefore prevent the third party from viewing information by maintaining the screen in the non-display state when authentication fails.

An example of the above-described processing executed by the controller 10 is explained with reference to the flowchart in FIG. 9. At the point at which the flow in FIG. 9 starts, the screen displayed on the display 2A is assumed to be in the non-display state.

The controller 10 uses the fingerprint sensor 18 to detect the fingerprint of a finger touching the fingerprint sensor 18 (step S101).

The controller 10 performs authentication using the fingerprint detected in step S101 (step S102). Specifically, the controller 10 compares (verifies) the fingerprint detected in step S101 with the fingerprint information preregistered in the storage 9 as the fingerprint data 9X.

The controller 10 determines whether the authentication was successful (step S103). The controller 10 can, for example, determine that authentication was successful when the fingerprint detected in step S101 matches the fingerprint information preregistered in the storage 9 as the fingerprint data 9X. The controller 10 can, for example, determine that authentication failed when the fingerprint detected in step S101 does not match the fingerprint information preregistered in the storage 9 as the fingerprint data 9X.

When it is determined that authentication has failed (step S103: No), the controller 10 maintains the non-display state of the display 2A, since a third party might be attempting to use the smartphone (step S104). The controller 10 then terminates this processing flow.

When it is determined that authentication was successful (step S103: Yes), the controller 10 releases the locked state of the smartphone 1 (step S105).

The controller 10 determines whether a predetermined operation has been performed on the smartphone 1 (step S106). For example, as the predetermined operation, the controller 10 determines whether the operation interface 3B has been pressed.

When it is determined that the predetermined operation has been performed (step S106: Yes), the controller 10 displays the home screen 31 on the display 2A (step S107). The controller 10 then terminates this processing flow.

When it is determined that the predetermined operation has not been performed (step S106: No), the controller 10 displays the notification screen 30 on the display 2A (step S108).

After causing the notification screen 30 to be displayed on the display 2A, the controller 10 determines whether a predetermined operation has been performed within a predetermined time period (step S109). For example, as the predetermined operation, the controller 10 determines whether the operation interface 3B has been pressed.

When it is determined that the predetermined operation has not been performed within the predetermined time period (step S109: No), the controller 10 terminates this processing flow without causing the screen on the display 2A to transition. Once the predetermined time period has elapsed after displaying the notification screen 30 on the display 2A in step S108, the controller 10 may set the display 2A to the non-display state by turning off the display 2A and then terminate this processing flow.

When it is determined that the predetermined operation has been performed within the predetermined time period (step S109: Yes), the controller 10 causes the display on the display 2A to transition to the home screen 31 (step S107). The controller 10 then terminates this processing flow.

In this manner, the smartphone 1 according to the present embodiment releases the lock and causes the home screen to be displayed when it is determined that the operation interface 3B was pressed and that authentication was successful. When it is determined that the operation interface 3B has not been pressed and that authentication was successful, the smartphone 1 causes the notification screen 30 to be displayed. The smartphone 1 thereby reduces the likelihood of the home screen 31 being displayed when the user performs an operation intending to cause the notification screen 30 to be displayed. Consequently, the smartphone 1 according to the present embodiment facilitates prevention of an erroneous operation.

In the above embodiment, the controller 10 has been described as causing the notification screen 30 to be displayed on the display 2A when it is determined that the operation interface 3 has not been pressed and that authentication was successful. However, the controller 10 may cause a different screen than the notification screen 30 to be displayed on the display 2A. For example, when the display 2A is in the non-display state, as illustrated in step S31 of FIG. 10, the controller 10 may cause a lock screen 50 to be displayed on the display 2A, as illustrated in step S32, when it is determined that the operation interface 3 has not been pressed and that authentication was successful. The lock screen 50 is, for example, a screen for inputting an operation to release the lock. In this case, the controller 10 need not execute internal processing to release the locked state even if fingerprint authentication is successful.

A notification 51, such as characters, is displayed on the lock screen 50 to prompt the user to input an operation to release the lock and transition to the home screen. For example, when transition to the home screen is caused by a touch operation on the touchscreen display 2, a notification such as "touch the screen to unlock" may be displayed on the display 2A. For example, when transition to the home screen is caused by a slide operation on the touchscreen display 2, a notification such as "slide to unlock" may be displayed on the display 2A.

Figure 10:
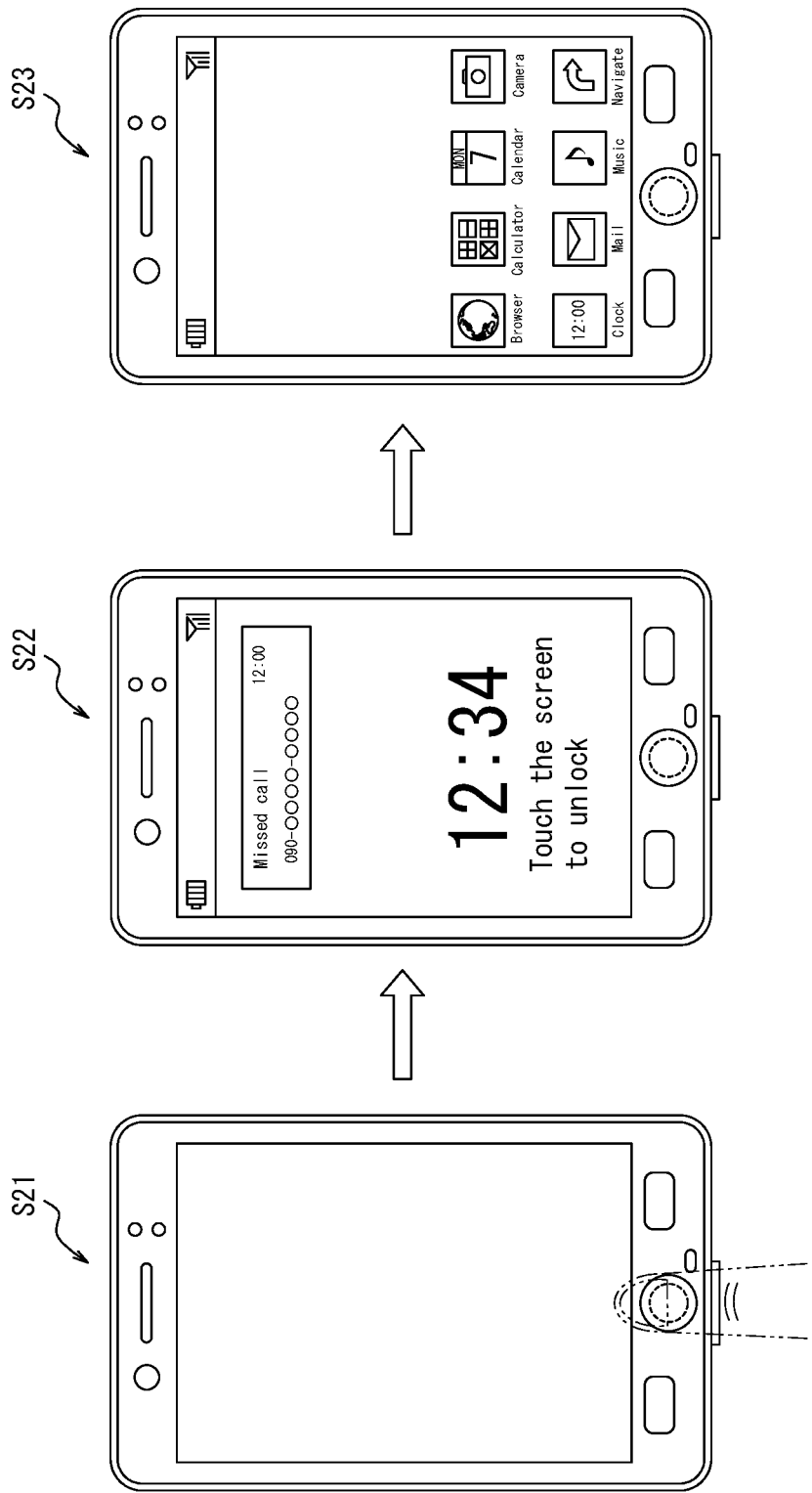
FIG. 10 illustrates an example of transitions of the screen displayed on the display.

Upon detecting that a predetermined operation to release the lock has been input, the controller 10 releases the locked state of the smartphone 1 and displays the home screen 31 on the display 2A, as illustrated in step S33 of FIG. 10. At the time that the controller 10 causes the lock screen 50 to be displayed on the display 2A, the controller 10 has already confirmed, by fingerprint authentication, that the operator of the smartphone 1 is a user with a preregistered fingerprint. Since the controller 10 has confirmed that a legitimate user is operating the smartphone 1, it poses no security risk to display the home screen 31 when a predetermined operation to release the lock is input, without performing authentication again or prompting for input of a password.

By inputting the predetermined operation, the user can safely cause the home screen 31 to be displayed without further action, such as performing a separate operation for authentication or inputting a password. The smartphone 1 displaying the lock screen 50 can thereby reduce the burden of operation input on the user.

The smartphone 1 displaying the lock screen 50 displays the home screen 31 when the user inputs a predetermined operation for releasing the lock. The smartphone 1 displaying the lock screen 50 can therefore provide users with a sense of secure use in that users themselves perform an operation to cause the home screen 31 to be displayed, unlike the case, for example, of the home screen 31 being displayed automatically by fingerprint authentication.

The controller 10 may complete internal processing for lock release when, for example, displaying the lock screen 50. In this case, when the user inputs a predetermined operation to the lock screen 50, the controller 10 executes processing to transition the display on the display 2A from the lock screen 50 to the home screen 31. As in the above-described case, the user can be provided with a sense of secure use.

Figure 11:
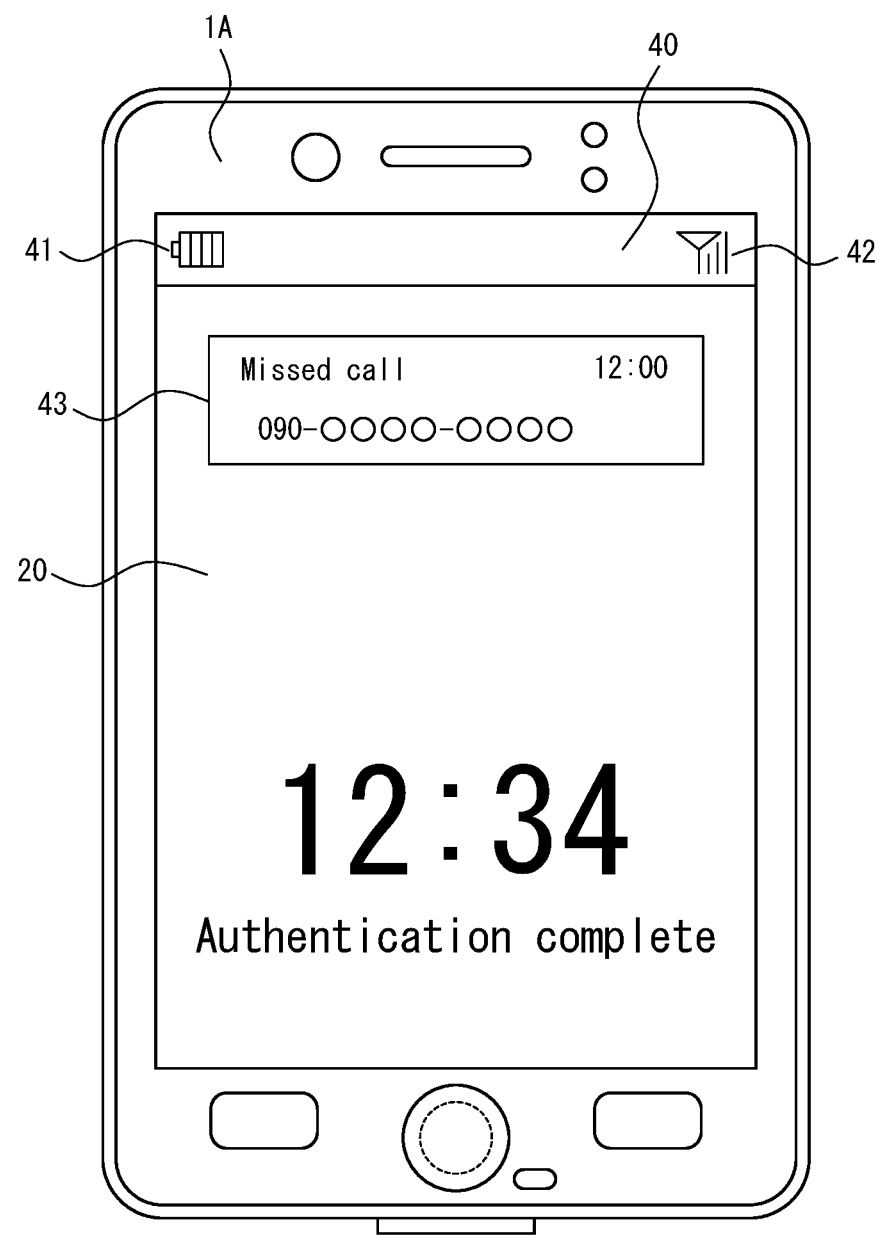
FIG. 11 illustrates an example of an indication that authentication was successful on the display.

In the above embodiment, the controller 10 displays an indication that authentication is successful on the display 2A when it is determined that the fingerprint detected by the fingerprint sensor 18 does not match the preregistered fingerprint information, i.e. when it is determined that authentication was successful. Successful authentication may, for example, be indicated by a display of characters such as "authentication complete", as illustrated in FIG. 11. Successful authentication may, for example, be indicated by the display of a predetermined code. Successful authentication may also, for example, be indicated by the color or the like of the screen displayed on the display.

The user does not necessarily have to be notified of successful authentication by a display on the screen. The user may, for example, be notified of successful authentication by sound, vibration, or the like.

While the display 2A is on, for example, i.e. while the display 2A is displaying a screen (display state), the controller 10 of the smartphone 1 may transition the display 2A to the non-display state when the operation interface 3D is pressed to turn the smartphone 1 off, or when the smartphone 1 is not operated for a preset time period. When the display 2A transitions in this way from the display state to the non-display state, the controller 10 switches the smartphone 1 from the unlocked state to the locked state. Upon the smartphone 1 entering the locked state, the controller 10 causes the fingerprint sensor 18 to operate intermittently and executes processing according to the flow described in FIG. 9 when detecting a fingerprint with the fingerprint sensor 18.

While the fingerprint sensor 18 is operating intermittently after the user presses the operation interface 3B to switch the smartphone 1 from the display state to the non-display state, the finger of the user that pressed the operation interface 3B may remain in contact with the operation interface 3B after pressing the operation interface 3B. If this is the case, the fingerprint sensor 18 might detect the fingerprint. Upon the fingerprint sensor 18 detecting the fingerprint, the processing flow described in FIG. 9 is executed, and the notification screen 30, for example, is displayed on the display 2A. The finger touching the operation interface 3B in this case, however, was not placed with the intention of switching the display 2A to the display state. Rather, the finger that was placed for switching the display 2A to the non-display state is simply remaining on the operation interface 3B. Therefore, the controller 10 switching the display 2A to the display state in this case is a an erroneous operation contrary to the user's intention.

Figure 9:
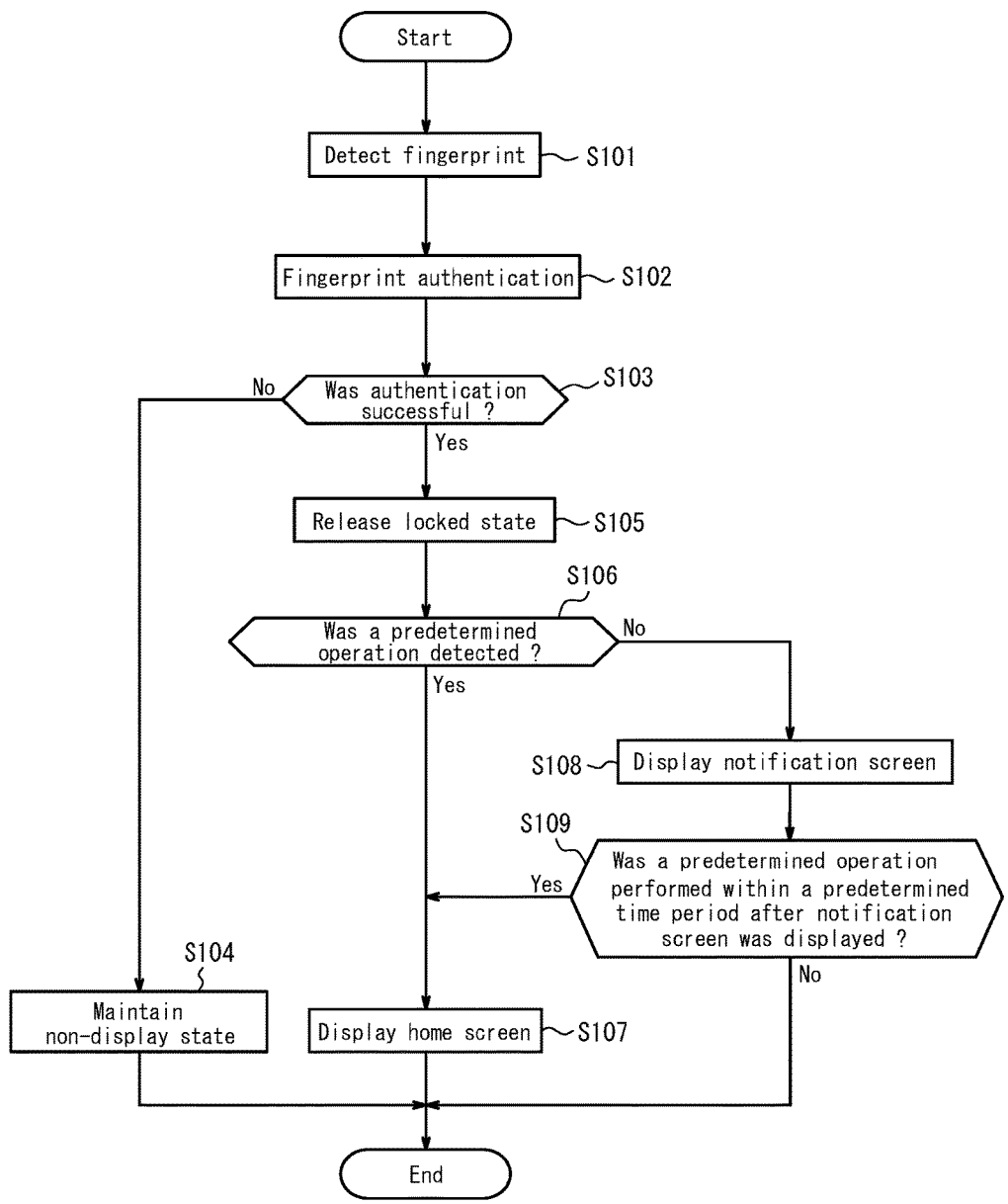
FIG. 9 is a flowchart illustrating an example of processing executed by a controller.

During a predetermined time period after the controller 10 transitions the display 2A to the non-display state, the controller 10 according to the present embodiment does not execute processing on the basis of a detected fingerprint, i.e. the processing described in FIG. 9 to verify the fingerprint and switch the display to the display state in accordance with the verification result, even when the fingerprint sensor 18 detects a fingerprint. The predetermined time period may be a length of time allowing a determination that the finger that pressed the operation interface 3B is in a state of contact with the operation interface 3B after the press.

Figure 12:
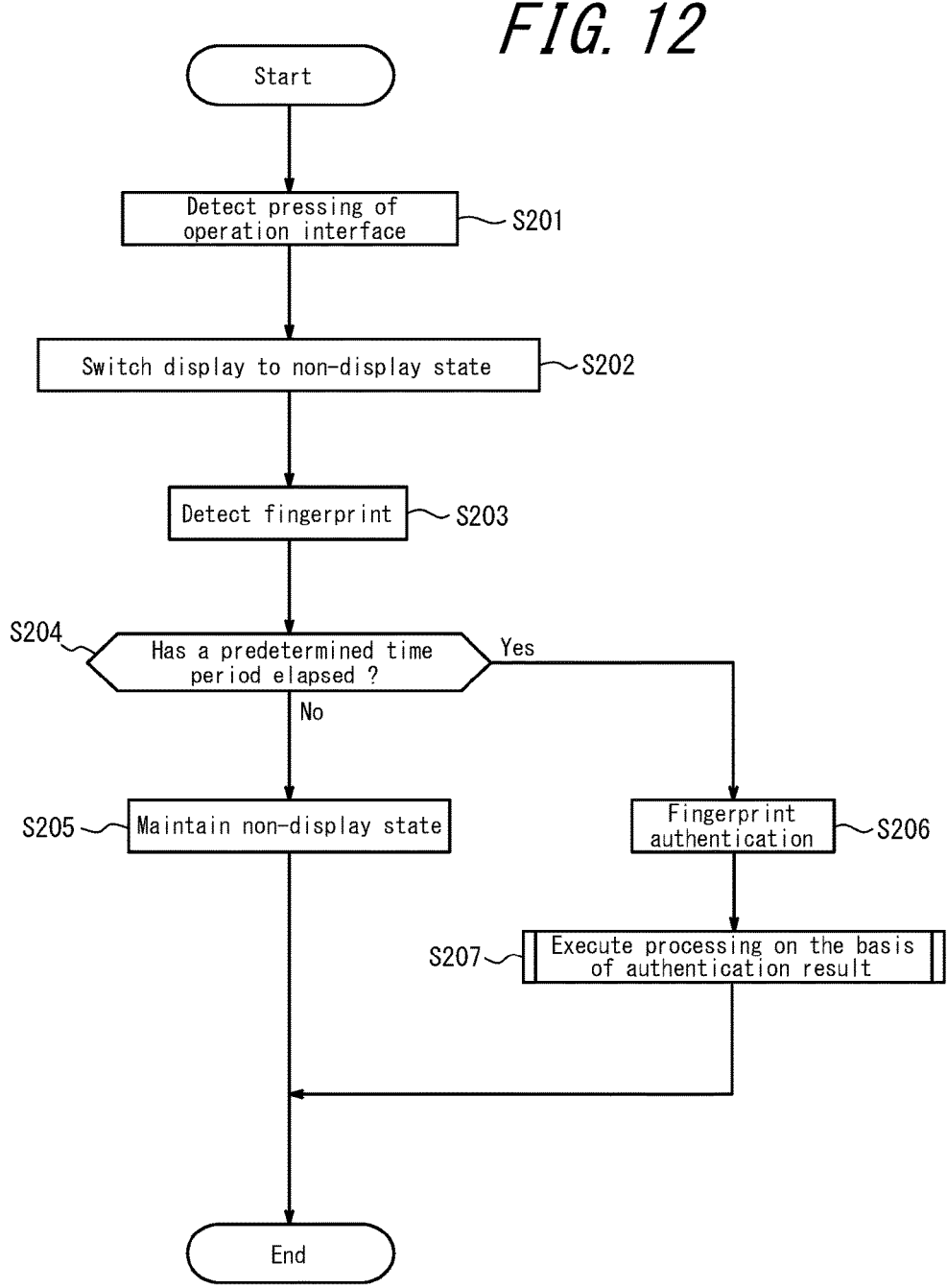
FIG. 12 is a flowchart illustrating an example of processing executed by the controller.

FIG. 12 is a flowchart illustrating an example of processing executed by the controller 10 when switching the display 2A to the non-display state. At the point at which the flow in FIG. 12 starts, the display 2A is assumed to be in the display state.

Upon the user pressing the operation interface 3, the controller 10 detects that the operation interface 3 was pressed (step S201).

The controller 10 switches the display 2A to the non-display state (step S202).

Upon the user placing a finger on the fingerprint sensor 18, the controller 10 detects the user's fingerprint with the fingerprint sensor 18 (step S203).

After switching the display 2A to the non-display state in step S202, the controller 10 determines whether a predetermined time period elapsed during the period up to when the fingerprint was detected in step S203 (step S204).

When it is determined that the predetermined time period had not elapsed during the period up to when the fingerprint was detected after switching the display 2A to the non-display state (step S204: No), the controller 10 does not execute processing to verify the fingerprint and switch the display to the display state in accordance with the verification result. In other words, the controller 10 maintains the non-display state of the display 2A (step S205).

When it is determined that the predetermined time period elapsed during the period up to when the fingerprint was detected after switching the display 2A to the non-display state (step S204: Yes), the controller 10 performs fingerprint authentication in the same way as in step S102 of FIG. 9 (step S206).

The controller 10 executes processing on the basis of the verification result of the fingerprint (step S207). Specifically, the controller 10 executes the processing described from step S103 to step S109 of FIG. 9.

In this way, for the predetermined time period after transitioning the display 2A to the non-display state, the smartphone 1 does not execute processing in response to detection of a fingerprint. Consequently, the display 2A does not enter the display state after the user performs an operation to place the display 2A in the non-display state, even if a finger comes into or remains in contact with the fingerprint sensor 18 unintentionally. The smartphone 1 thereby facilitates prevention of an erroneous operation.

The processing for preventing an erroneous operation after switching the display 2A to the non-display state is not limited to the above-described example.

For example, the controller 10 in the above-described example determines, in step S204, whether the predetermined time period has elapsed in the period up to when a fingerprint is detected after switching the display 2A to the non-display state. However, the controller 10 may, for example, determine whether the predetermined time period has elapsed since the display 2A switched to the non-display state and the user released the finger from the operation interface 3, i.e. since the fingerprint sensor 18 has stopped detecting contact. In this case, the controller 10 does not execute processing in response to a detected fingerprint for the predetermined time period from when contact is no longer detected by the fingerprint sensor 18 after transitioning the display 2A to the non-display state.

When it is determined that the predetermined time period has not elapsed in the period up to when a fingerprint is detected after switching the display 2A to the non-display state (step S204: No), the controller 10 in the above example has been described as not executing processing in response to the detected fingerprint. However, the controller 10 may, for example, suspend operation of the fingerprint sensor 18 until the predetermined time period has elapsed after switching the display 2A to the non-display state. In this case, for the predetermined time period after the display 2A has entered the non-display state, the fingerprint sensor 18 does not detect a fingerprint even if the user's finger contacts the fingerprint sensor 18, thereby facilitating prevention of an erroneous operation, as described above. In this case, the controller 10 causes the fingerprint sensor 18 to operate again after the predetermined time period has elapsed.

When it is determined that the predetermined time period has not elapsed up to when a fingerprint is detected after switching the display 2A to the non-display state (step S204: No), the controller 10 in the above example has been described as not executing processing in response to the detected fingerprint. However, the controller 10 may, for example, execute the processing up to and including the verification of the fingerprint detected by the fingerprint sensor 18 against the fingerprint information. In this case, the controller 10 need not execute processing on the basis of the verification result. If the controller 10 does not execute processing on the basis of the verification result, the display 2A is not transitioned to the display state, thereby facilitating prevention of an erroneous operation, as described above.

Second Embodiment

The processing executed by the controller 10 of the smartphone 1 is not limited to those described in the first embodiment. In the second embodiment, an example of other processing executed by the controller 10 is described. In the second embodiment, the configuration of the smartphone 1 is the same as in the first embodiment. Hence, only the processing is described here, with a description of the configuration being omitted.

In the present embodiment, the controller 10 measures the time period that the operation interface 3B is pressed (press duration). The controller 10 causes the notification screen 30 or the home screen 31 to be displayed on the display 2A in accordance with the press duration.

When, for example, it is determined that the press duration is a predetermined time period or longer and that authentication was successful, the controller 10 causes the home screen 31 to be displayed on the display 2A, as illustrated in step S12 of FIG. 7. The predetermined time period may be determined in advance and may, for example, be the length of time for determining that the press is a so-called "long press".

When, for example, it is determined that the press duration is less than a predetermined time period and that authentication was successful, the controller 10 causes the notification screen 30 to be displayed on the display 2A, as illustrated in step S22 of FIG. 8.

Regardless of the press duration, the controller 10 may release the locked state as internal processing when it is determined that authentication was successful.

Regardless of the press duration, the controller 10 may maintain a non-display state of the display 2A when it is determined that authentication has failed.

An example of the above-described processing executed by the controller 10 in the second embodiment is explained with reference to the flowchart in FIG. 13. At the point at which the flow in FIG. 13 starts, the screen displayed on the display 2A is assumed to be in the non-display state.

Figure 13:
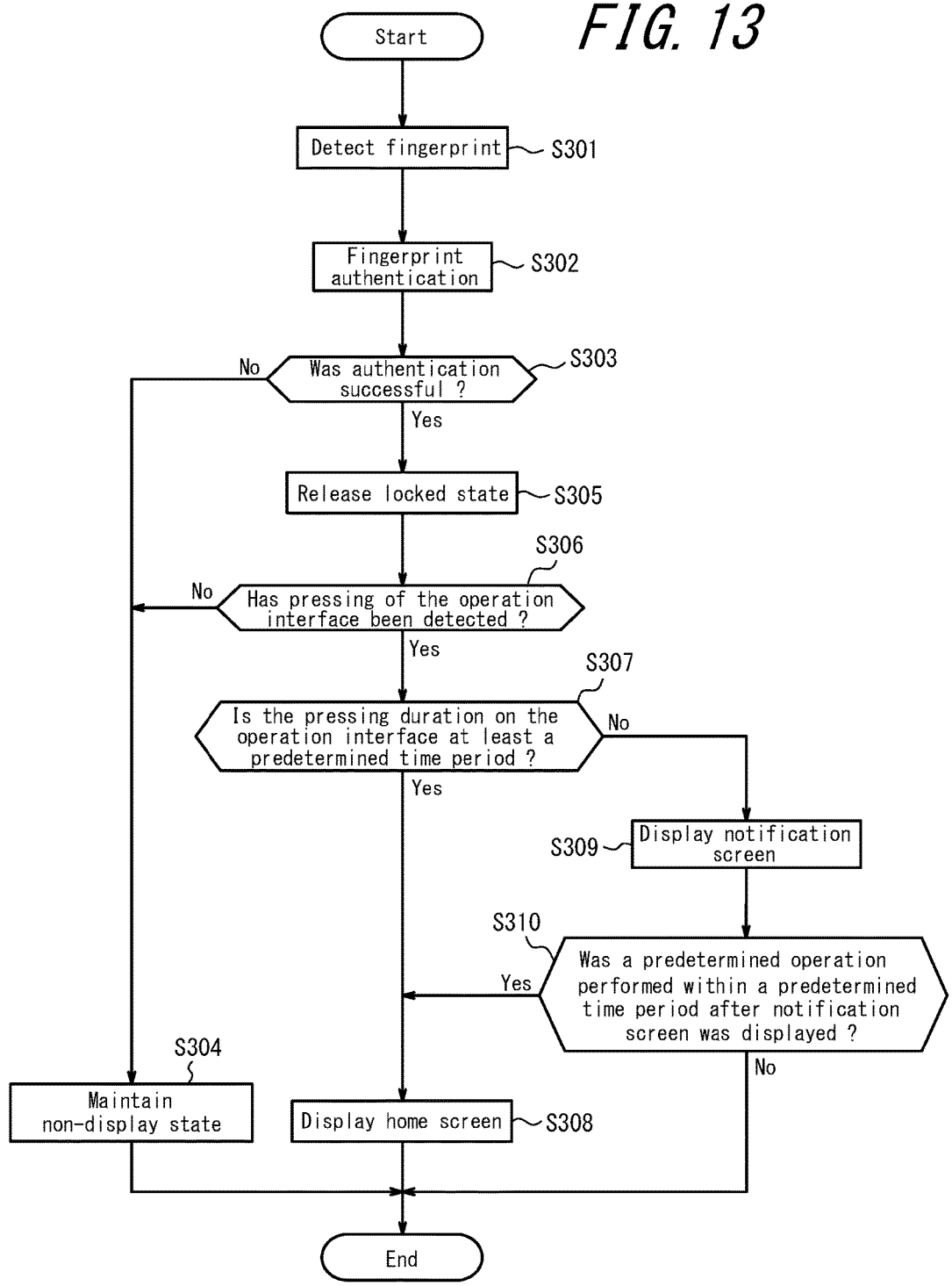
FIG. 13 is a flowchart illustrating an example of processing executed by the controller.

In the flowchart of FIG. 13, step S301 through step S305 are the same as step S101 through step S105 in the flowchart of FIG. 9. In other words, the controller 10 performs fingerprint authentication. When the authentication fails (step S303: No), the controller 10 maintains the non-display state of the display 2A (step S304), and when the authentication is successful (step S303: Yes), the controller 10 releases the locked state of the smartphone 1 (step S305).

The controller 10 determines whether pressing of the operation interface 3B has been detected (step S306).

When it is determined that pressing of the operation interface 3B has not been detected (step S306: No), the controller 10 maintains the non-display state of the display 2A (step S304).

When it is determined that pressing of the operation interface 3B has been detected (step S306: Yes), the controller 10 determines whether the press duration with respect to the operation interface 3B is at least a predetermined time period (step S307).

When it is determined that the press duration with respect to the operation interface 3B is at least the predetermined time period (step S307: Yes), the controller 10 displays the home screen 31 on the display 2A (step S308). The controller 10 then terminates this processing flow.

When it is determined that the press duration with respect to the operation interface 3B is less than the predetermined time period (step S307: No), the controller 10 displays the notification screen 30 on the display 2A (step S309).

After causing the notification screen 30 to be displayed on the display 2A, the controller 10 determines whether a predetermined operation has been performed within the predetermined time period (step S310). Since the processing in step S310 is similar to the processing in step S109 of FIG. 9, a detailed explanation is omitted.

In this way, in addition to performing fingerprint authentication, the smartphone 1 according to the second embodiment displays one of the notification screen 30 and the home screen 31 on the display 2A in accordance with the press duration with respect to the operation interface 3B. In other words, which one of the notification screen 30 and the home screen 31 is displayed on the smartphone 1 according to the present embodiment is determined in accordance with the press duration, which is easy for the user to adjust. When the fingerprint authentication is successful, the smartphone 1 causes either the notification screen 30 or the home screen 31 to be displayed. Consequently, the smartphone 1 according to the present embodiment facilitates prevention of an erroneous operation while maintaining security.

Third Embodiment

Figure 14:
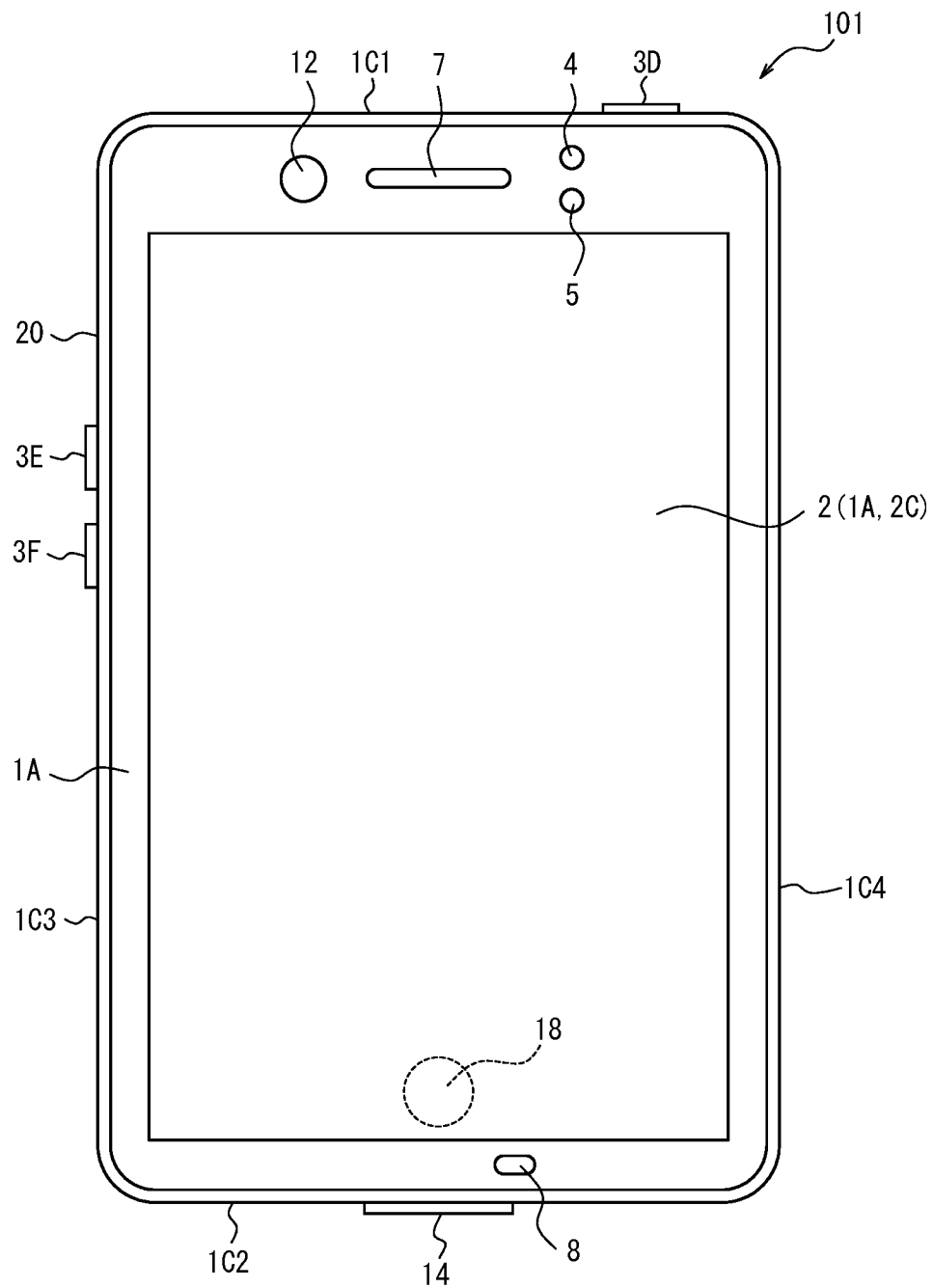
FIG. 14 is a front view of a smartphone according to a third embodiment.

FIG. 14 is a front view of a smartphone 101 according to a third embodiment. The smartphone 101 according to the third embodiment includes a pressure sensitive touch panel 2C on the front face 1A instead of the touchscreen 2B of the smartphone 1 according to the first embodiment. The pressure sensitive touch panel 2C is a touch panel capable of detecting a press (a change in pressure). The pressure sensitive touch panel 2C is disposed in overlap with the display 2A. The fingerprint sensor 18 is built into a portion of the pressure sensitive touch panel 2C in front view. When the user places the thumb at the position at which the fingerprint sensor 18 is built in, the smartphone 101 can detect the pressure with the pressure sensitive touch panel 2C and can detect a fingerprint with the fingerprint sensor 18. The smartphone 101 according to the third embodiment does not include the operation interfaces 3A to 3C, for example as illustrated in FIG. 14. Since the remaining configuration is similar to that of the smartphone 1 according to the first embodiment, a detailed explanation is omitted here. Constituent elements of the smartphone according to the third embodiment that are similar to those of the smartphone 1 according to the first embodiment are described using the same reference signs as those used in the first embodiment.

The smartphone 101 according to the present embodiment executes processing on the basis of, for example, the pressing force detected by the pressure sensitive touch panel 2C and the fingerprint detected by the fingerprint sensor 18. For example, the controller 10 of the smartphone 101 displays the notification screen 30 on the display 2A when it is determined that the pressing force on the pressure sensitive touch panel 2C is less than a predetermined threshold and that authentication based on the fingerprint detected by the fingerprint sensor 18 was successful. The controller 10 of the smartphone 101 displays the home screen 31 on the display 2A when it is determined that the pressing force on the pressure sensitive touch panel 2C is greater than or equal to a predetermined threshold and that authentication based on the fingerprint detected by the fingerprint sensor 18 was successful. The predetermined threshold may be the value of pressure allowing a determination of whether contact by the user's finger on the pressure sensitive touch panel 2C represents an intention to press or an intention simply to touch the pressure sensitive touch panel 2C.

An example of the above-described processing executed by the controller 10 in the third embodiment is explained with reference to the flowchart in FIG. 15. At the point at which the flow in FIG. 15 starts, the screen displayed on the display 2A is assumed to be in the non-display state.

In the flowchart of FIG. 15, step S401 through step S405 are the same as step S101 through step S105 in the flowchart of FIG. 9. In other words, the controller 10 performs fingerprint authentication. When the authentication fails (step S403: No), the controller 10 maintains the non-display state of the display 2A (step S404), and when the authentication is successful (step S403: Yes), the controller 10 releases the locked state of the smartphone 1 (step S405).

The controller 10 detects the pressing force on the pressure sensitive touch panel 2C (step S406).

The controller 10 determines whether the pressing force detected in step S406 is equal to or greater than a predetermined threshold (step S407).

When it is determined that the pressing force detected in step S406 is equal to or greater than the predetermined threshold (step S407: Yes), the controller 10 displays the home screen 31 on the display 2A (step S408).

When it is determining that the pressing force detected in step S406 is less than the predetermined threshold (step S407: No), the controller 10 displays the notification screen 30 on the display 2A (step S409).

After causing the notification screen 30 to be displayed on the display 2A, the controller 10 determines whether a predetermined operation has been performed within a predetermined time period (step S410). Since the processing in step S410 is similar to the processing in step S109 of FIG. 9, a detailed explanation is omitted.

In this way, in addition to performing fingerprint authentication, the smartphone 101 according to the third embodiment displays one of the notification screen 30 and the home screen 31 on the display 2A in accordance with the pressing force on the pressure sensitive touch panel 2C. In other words, which one of the notification screen 30 and the home screen 31 is displayed on the smartphone 101 according to the present embodiment is determined in accordance with the pressing force, which is easy for the user to adjust. When the fingerprint authentication is successful, the smartphone 101 causes either the notification screen 30 or the home screen 31 to be displayed. Consequently, the smartphone 101 according to the present embodiment facilitates prevention of an erroneous operation while maintaining security.

In the above embodiments, the smartphone has been described as an example of an electronic device, but an electronic device according to the appended claims is not limited to being a smartphone. An electronic device according to the appended claims may be an electronic device other than a smartphone. The electronic device encompasses a mobile phone, a tablet, a portable personal computer, a digital camera, a media player, an e-book reader, a navigator, and a game device, for example, but is not limited to these devices.

Characteristic embodiments have been described for a complete and clear disclosure of the techniques according to the appended claims. The appended claims, however, are not limited to the above embodiments and are to be construed as encompassing all of the possible modifications and alternate configurations that a person of ordinary skill in the art could make within the scope of the fundamental features illustrated in this disclosure.

For example, in the above embodiments, an example of the controller 10 maintaining the non-display state of the display 2A when fingerprint authentication fails has been described, but the processing when fingerprint authentication fails is not limited to this example. The controller 10 may, for example, turn on the display 2A in a state such that a portion of information is hidden when fingerprint authentication has failed. Alternatively, the controller 10 may, for example, display the notification screen 30 on the display 2A in a state such that a portion of the notification information is hidden when fingerprint authentication has failed. In this case, the time, the battery indicator 41, and the radio wave level indicator 42, for example, are displayed on the notification screen 30, whereas other notification information is not displayed. Consequently, when the operator of the smartphone might be a nonregistered third-party, leakage of information on the owner of the smartphone can be prevented more easily.

The controller 10 may, for example, control the display 2A on the basis of information other than the information described in the above embodiments. For example, the controller 10 may control the display 2A on the basis of information detected by the proximity sensor 5. For example, the controller 10 may maintain the non-display state of the display 2A when it is determined that an object is in front of the proximity sensor 5 on the basis of information detected by the proximity sensor 5. Consequently, the display 2A can be prevented from entering the display state when, for example, the smartphone is inside a pocket or the like.

The invention claimed is:

1. An electronic device comprising:
   a push button;
   a fingerprint sensor configured to detect a fingerprint of a finger contacting the push button;
   a display; and
   a controller configured to release a locked state when it is determined that the push button has been pressed and that the fingerprint detected by the fingerprint sensor matches preregistered fingerprint information,
   wherein the controller
   measures a press duration with respect to the push button,
   displays a first screen displaying first information on the display when it is determined that the press duration is less than a predetermined time period as the locked state is released due to the fingerprint detected by the fingerprint sensor matching the preregistered fingerprint information, and
   displays a second screen displaying second information on the display when it is determined that the press duration is equal to or greater than the predetermined time period as the locked state is released due to the fingerprint detected by the fingerprint sensor matching the preregistered fingerprint information.

2. The electronic device of claim 1, wherein after executing processing to determine whether the fingerprint detected by the fingerprint sensor matches preregistered fingerprint information, the controller releases the locked state when it is determined that the push button has been pressed within the predetermined time period.

3. The electronic device of claim 1, wherein the controller
   displays the first screen which is a notification screen displaying the first information which is notification information on the display when it is determined that the push button has not been pressed and that the fingerprint detected by the fingerprint sensor matches the preregistered fingerprint information, and
   displays the second screen which is a home screen displaying the second information which includes functions and allowing execution of functions on the display when it is determined that the press duration is equal to or greater than the predetermined time period and that the fingerprint detected by the fingerprint sensor matches the preregistered fingerprint information.

4. The electronic device of claim 3, wherein the controller does not display a screen on the display when it is determined that the fingerprint detected by the fingerprint sensor does not match the preregistered fingerprint information.

5. The electronic device of claim 3, wherein the controller transitions the display to a non-display state upon detecting that the push button has been pressed while the display is in a display state, and does not execute processing in response to a fingerprint detected by the fingerprint sensor for a predetermined time period from when the display is transitioned to the non-display state or from when contact on the fingerprint sensor is no longer detected after the display is transitioned to the non-display state.

6. The electronic device of claim 3, wherein when it is determined that the fingerprint detected by the fingerprint sensor matches preregistered fingerprint information the controller displays, on the display, an indication that matching has been determined.

7. The electronic device of claim 1, wherein
the first screen is a notification screen and the first information is notification information, and
the second screen is a home screen and the second information are functions for which execution is allowed.

8. The electronic device of claim 1, wherein the controller displays a lock screen on the display, which is a touchscreen display, when it is determined that the push button has not been pressed and that the fingerprint detected by the fingerprint sensor matches the preregistered fingerprint information, and
releases the locked state upon detecting a predetermined input operation on the touchscreen display.

9. An electronic device comprising:
a display;
a fingerprint sensor configured to detect a fingerprint of a finger contacting the display;
a pressure sensor configured to measure a pressure of the finger; and
a controller,
wherein the controller
displays a notification screen displaying notification information on the display when it is determined that the pressure is less than a predetermined threshold as the locked state is released due to the fingerprint detected by the fingerprint sensor matching preregistered fingerprint information, and
displays a home screen allowing execution of functions on the display when it is determined that the pressure is equal to or greater than the predetermined threshold as the locked state is released due to the fingerprint detected by the fingerprint sensor matching the preregistered fingerprint information.

10. A control method for an electronic device comprising a push button and a fingerprint sensor configured to detect a fingerprint of a finger contacting the push button, the control method comprising:
releasing a locked state when it is determined that the push button has been pressed and that the fingerprint detected by the fingerprint sensor matches preregistered fingerprint information;
measuring a press duration with respect to the push button;
displaying a first screen displaying first information on a display when it is determined that the press duration is less than a predetermined time period as the locked state is released due to the fingerprint detected by the fingerprint sensor matching the preregistered fingerprint information, and
displays a second screen displaying second information on the display when it is determined that the press duration is equal to or greater than the predetermined time period as the locked state is released due to the fingerprint detected by the fingerprint sensor matching the preregistered fingerprint information.

11. The control method of claim 10, wherein
the first screen is a notification screen and the first information is notification information, and
the second screen is a home screen and the second information are functions for which execution is allowed.

12. An electronic device comprising:
a push button;
a fingerprint sensor configured to detect a fingerprint of a finger contacting the push button;
a display; and
a controller configured to release a locked state when it is determined that the push button has been pressed and that the fingerprint detected by the fingerprint sensor matches preregistered fingerprint information,
wherein the controller
displays a notification screen displaying notification information on the display when it is determined that the push button has not been pressed as the locked state is released due to the fingerprint detected by the fingerprint sensor matching the preregistered fingerprint information,
displays a home screen allowing execution of functions on the display when it is determined that the push button has been pressed as the locked state is released due to the fingerprint detected by the fingerprint sensor matching the preregistered fingerprint information,
transitions the display to a non-display state upon detecting that the push button has been pressed while the display is in a display state, and
does not execute processing in response to a fingerprint detected by the fingerprint sensor for a predetermined time period from when the display is transitioned to the non-display state or from when contact on the fingerprint sensor is no longer detected after the display is transitioned to the non-display state.

* * * * *